United States Patent
Horne

(10) Patent No.: US 10,901,103 B2
(45) Date of Patent: Jan. 26, 2021

(54) DETERMINING ANISOTROPY FOR A BUILD SECTION OF A WELLBORE

(71) Applicant: Chevron U.S.A. Inc., San Ramon, CA (US)

(72) Inventor: Stephen Allan Horne, Haywards Heath (GB)

(73) Assignee: CHEVRON U.S.A. INC., San Ramon, CA (US)

(*) Notice: Subject to any disclaimer, the term of this patent is extended or adjusted under 35 U.S.C. 154(b) by 259 days.

(21) Appl. No.: 15/926,700

(22) Filed: Mar. 20, 2018

(65) Prior Publication Data

US 2019/0293814 A1 Sep. 26, 2019

(51) Int. Cl.
*G01V 1/30* (2006.01)
*G01V 1/40* (2006.01)
(Continued)

(52) U.S. Cl.
CPC .............. *G01V 1/306* (2013.01); *G01V 1/162* (2013.01); *G01V 1/40* (2013.01); *G01V 1/42* (2013.01); *G01V 2210/127* (2013.01); *G01V 2210/1295* (2013.01); *G01V 2210/1429* (2013.01); *G01V 2210/161* (2013.01); *G01V 2210/626* (2013.01)

(58) Field of Classification Search
CPC .......... G01V 1/306; G01V 1/42; G01V 1/162; G01V 1/40; G01V 2210/161; G01V 2210/127; G01V 2210/626; G01V 2210/1295; G01V 2210/1429
See application file for complete search history.

(56) References Cited

U.S. PATENT DOCUMENTS

| 7,480,206 B2 | 1/2009 | Hill |
| 7,537,058 B2 | 5/2009 | Gullapalli et al. |

(Continued)

FOREIGN PATENT DOCUMENTS

| WO | 2015187147 A1 | 12/2015 | |
| WO | WO-2019180529 A1 * | 9/2019 | ............. G01V 1/306 |

OTHER PUBLICATIONS

Esmersoy, Cengiz; "Inversion of P and SV Waves from Multicomponent Offset Vertical Seismic Profiles"; (1990), Geophysics, vol. 55, No. 1, pp. 39-50.

(Continued)

*Primary Examiner* — Daniel Pihulic

(57) ABSTRACT

One embodiment includes receiving seismic data from a plurality of seismic sensors located proximate to a build section of a wellbore that is drilled into a subsurface. The seismic data is recorded for a plurality of seismic waves, at different angles, sent from a plurality of seismic sources towards the plurality of seismic sensors. Locations of the plurality of seismic sources relative to locations of the plurality of seismic sensors are such that the plurality of seismic waves are essentially planar at the plurality of seismic sensors. The subsurface is essentially homogenous proximate to the build section. For at least a portion of the plurality of seismic waves, the embodiment includes determining a slowness vector for each seismic wave, and determining a phase velocity and a phase angle. The embodiment includes determining at least one anisotropic parameter value for the build section, determining a vertical velocity value, and using these.

24 Claims, 21 Drawing Sheets

(51) Int. Cl.
*G01V 1/16* (2006.01)
*G01V 1/42* (2006.01)

(56) References Cited

U.S. PATENT DOCUMENTS

| | | | |
|---|---|---|---|
| 7,812,203 | B2 | 10/2010 | Balczewski |
| 7,964,150 | B2 | 6/2011 | Balczewski |
| 8,201,626 | B2 | 6/2012 | Balczewski |
| 8,332,156 | B2 | 12/2012 | Liu et al. |
| 9,284,826 | B2 | 3/2016 | Campbell et al. |
| 9,777,563 | B2 | 10/2017 | Balczewski |
| 9,840,898 | B2 | 12/2017 | Kasevich et al. |
| 2008/0102000 | A1 | 5/2008 | Balczewski |
| 2010/0135115 | A1 | 6/2010 | Sun et al. |
| 2014/0288909 | A1 | 9/2014 | Prestwood et al. |
| 2015/0012251 | A1 | 1/2015 | Horne et al. |
| 2016/0034612 | A1 | 2/2016 | Johnsen |
| 2016/0281456 | A1 | 9/2016 | Sims et al. |
| 2016/0281471 | A1 | 9/2016 | Buell et al. |
| 2016/0281494 | A1 | 9/2016 | Shirdel et al. |
| 2016/0291180 | A1 | 10/2016 | Washbourne et al. |
| 2017/0058186 | A1 | 3/2017 | Oghena et al. |
| 2017/0075001 | A1* | 3/2017 | McColpin ............... G01V 1/303 |
| 2017/0276813 | A1 | 9/2017 | Sun et al. |
| 2018/0180766 | A1* | 6/2018 | Therrien ............... E21B 47/123 |
| 2019/0293814 | A1* | 9/2019 | Horne ............... G01V 1/42 |

OTHER PUBLICATIONS

Esmersoy, Cengiz; "Velocity Estimation from Offset VSPs Using Direct P and Converted SV-Waves"; 58th Annual International Meeting, SEG, Expanded Abstracts, pp. 538-541.

Leaney, W. Scott, et al.; "Anisotropic Vector Plane Wave Decomposition for 3D VSP Data"; (2002), SEG International Exposition and 72nd Annual Meeting, 4 pages.

Leaney, W. Scott, et al.; Parametric Decomposition of Offset VSP Wave Fields; (1989), 59th Annual International Meeting, SEG, Expanded Abstracts, pp. 26-29.

Leaney, W. Scott, et al.; "Parametric Wavefield Decomposition and Applications"; (1990), 60th Annual International Meeting, SEG, Expanded Abstracts, pp. 1097-1100.

Miller, Douglas E., et al.; "An Exact Inversion for Anisotropic Moduli from Phase Slowness Data"; (1994), Journal of Geophysical Research, vol. 99, No. B11, pp. 21,651-21,657.

Owusu, J.C., et al.; "Slowness Surface Construction and Inversion from 3D VSP Data"; (2011), First Break, vol. 29, pp. 45-50.

Shankar, Uma, et al.; "Assessment of Gas Hydrate Saturation in Marine Sediments from Resistivity and Compressional—Wave Velocity Log Measurements in the Mahanadi Basin, India"; (2014), Marine and Petroleum Geology, vol. 58, pp. 265-277.

Thornburgh, H.R.; "Wave-Front Diagrams in Seismic Interpretation"; (1930), AAPG Bulletin, vol. 14, pp. 185-200.

Webster, Paul, et al.; "DAS Microseismic"; (2016), Focus Article, CSEG Recorder, pp. 38-39.

International Search Report, dated Jun. 4, 2019, during the prosecution of International Application No. PCT/IB2019/051874.

Written Opinion of the International Searching Authority, dated Jun. 4, 2019, during the prosecution of International Application No. PCT/IB2019/051874.

Banik, Niranjan, et al.; "Effects of VTI Anisotropy on Shale Reservoir Characterization"; SPE 150268, (2012), pp. 1-7.

Miller, et al.; "An Exact Inversion for Anisotropic Moduli from Phase Slowness Data"; (1994), Journal of Geophysical Research, vol. 99, No. B11, pp. 21,651-21,657.

Thomsen, Leon; "Weak Elastic Anistropy"; (1986), Geophysics, vol. 51, No. 10, pp. 1954-1966.

* cited by examiner

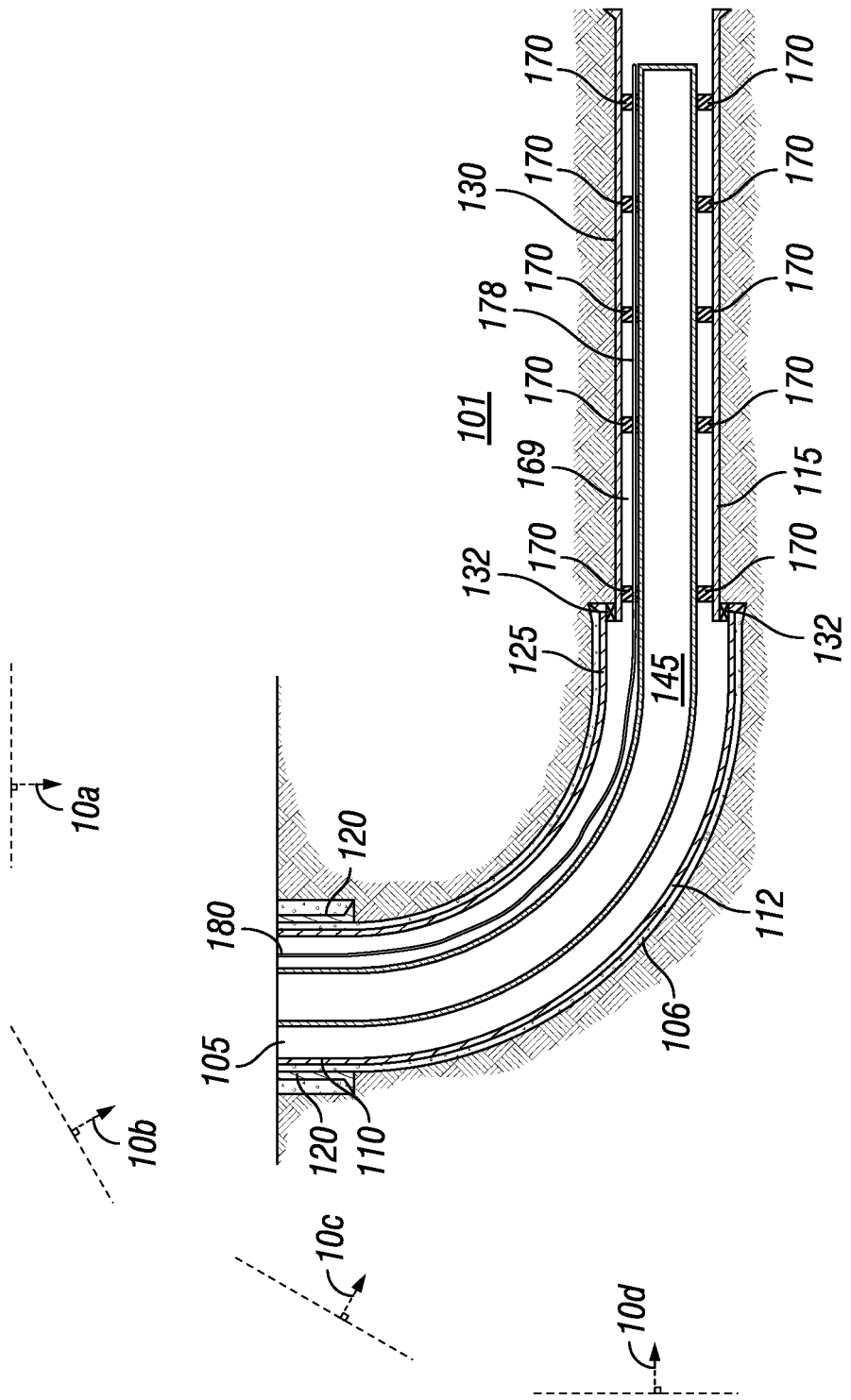

DETERMINING ANISOTROPY FOR A BUILD SECTION OF A WELLBORE

CROSS REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to seismic surveillance in the hydrocarbon industry, and more specifically, to determining anisotropy for a build section of a wellbore.

BACKGROUND

Seismic exploration involves surveying subterranean geological media for hydrocarbon deposits. An active survey typically involves deploying seismic sources and seismic sensors at predetermined locations. The seismic sources generate seismic waves, which propagate into the geological medium creating pressure changes and vibrations. Variations in physical properties of the geological medium change the properties of the seismic waves, such as their direction of propagation and other properties. The two main types of seismic waves are P waves (also referred to as compressional waves) and S waves (also referred to as shear waves). P waves relate to pressure and pass through liquids and solids. S waves relate to shear and pass through solids. P waves typically travel faster than S waves.

Portions of the seismic waves reach the seismic sensors. Some seismic sensors are sensitive to pressure changes (e.g., hydrophones), others to particle motion (e.g., geophones), and industrial surveys may deploy one type of sensor or both. Some methods use fiber optic point sensors and/or fiber optic cables as seismic sensors. In response to the detected seismic waves, the seismic sensors generate corresponding electrical signals, known as traces, and record them in storage media as seismic data. The seismic data will include a plurality of "shots" (individual instances of the seismic source being activated), each of which are associated with a plurality of traces recorded at the plurality of seismic sensors.

The seismic data is processed to create seismic images that can be interpreted to identify subsurface geologic features including hydrocarbon deposits. The processing may include data conditioning methods (e.g., deghosting, noise attenuation, spectral enhancement, etc.), velocity estimation (e.g., semblance analysis, tomography, etc.), and seismic imaging (e.g., time migration, depth migration, reverse time migration, etc.). The seismic images that are produced are a representation of the physical subsurface and can be used to identify hydrocarbon reservoirs. For example, the seismic images may be used to control well drilling in order to drill wellbores that will produce hydrocarbons from the hydrocarbon reservoirs.

Processing the seismic data oftentimes includes determining anisotropy. Anisotropy is the variation of a physical property depending on the direction in which the property is measured. For example, rocks such as shales are anisotropic due to layering and a partial alignment of plate-like clay minerals, and when seismic waves travel through such anisotropic layers, the seismic velocity of the reflected waves vary depending on the direction in which the velocity is measured. Anisotropy is represented by at least one anisotropic parameter value, and anisotropy is used to generate seismic images.

The ability to define, at high granularity, the location of rock and fluid property changes in the subsurface is crucial to our ability to make the most appropriate decisions for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

Thus, there exists a need in the area of anisotropy, and in particular, a need for determining anisotropy for a build section of a wellbore.

SUMMARY

In one aspect, provided herein is an embodiment of a system for performing a seismic survey. The system comprises a plurality of seismic sources to send a plurality of seismic waves, at different angles, towards a plurality of seismic sensors proximate to a build section of a wellbore that is drilled into a subsurface. The subsurface is essentially homogenous proximate to the build section. Locations of the plurality of seismic sources relative to locations of the plurality of seismic sensors are such that the plurality of seismic waves are essentially planar at the plurality of seismic sensors. The plurality of seismic sensors record seismic data for the plurality of seismic waves received at the plurality of seismic sensors from the plurality of seismic sources.

In one aspect, provided herein is an embodiment of a method of determining anisotropy for a build section of a wellbore. The method comprises receiving seismic data from a plurality of seismic sensors located proximate to a build section of a wellbore that is drilled into a subsurface. The seismic data is recorded for a plurality of seismic waves, at different angles, sent from a plurality of seismic sources towards the plurality of seismic sensors, and locations of the plurality of seismic sources relative to locations of the plurality of seismic sensors are such that the plurality of seismic waves are essentially planar at the plurality of seismic sensors. The subsurface is essentially homogenous proximate to the build section. For at least a portion of the plurality of seismic waves, the method includes determining a slowness vector for each seismic wave, each slowness vector comprises a horizontal slowness component value and a vertical slowness component value, and determining a phase velocity and a phase angle for each seismic wave. The method includes determining at least one anisotropic parameter value for the build section based on fitting a model to at least a portion of the determined slowness vectors. The method includes determining a vertical velocity value based on fitting the model to at least a portion of the determined phase velocities. The method includes using the at least one anisotropic parameter value and the determined vertical velocity value to generate a digital seismic image, a stress model, or any combination thereof.

In one aspect, provided herein is an embodiment of a system comprising a processor and a memory operatively connected to the processor, the memory storing instructions that, when executed by the processor, cause the system to receive seismic data from a plurality of seismic sensors located proximate to a build section of a wellbore that is drilled into a subsurface. The seismic data is recorded for a plurality of seismic waves, at different angles, sent from a plurality of seismic sources towards the plurality of seismic sensors. Locations of the plurality of seismic sources relative to locations of the plurality of seismic sensors are such that the plurality of seismic waves are essentially planar at the plurality of seismic sensors. The subsurface is essentially homogenous proximate to the build section. For at least a portion of the plurality of seismic waves, the system includes determine a slowness vector for each seismic wave, each slowness vector comprises a horizontal slowness component value and a vertical slowness component value, and determine a phase velocity and a phase angle for each seismic wave. The system includes determining at least one anisotropic parameter value for the build section based on fitting a model to at least a portion of the determined slowness vectors. The system includes determining a vertical velocity value based on fitting the model to at least a portion of the determined phase velocities. The system includes using the at least one anisotropic parameter value and the determined vertical velocity value to generate a digital seismic image, a stress model, or any combination thereof.

DESCRIPTION OF THE DRAWINGS

FIGS. 2A-1, 2A-2, 2B-1, 2B-2, 2C-1, 2C-2, 2D-1, and 2D-2 illustrate various capillary tubing installation schemes consistent with the fiber optic cable of FIG. 1A.

FIG. 3 illustrates one embodiment of a computing system for determining anisotropy for a build section of a wellbore.

FIG. 4 illustrates one embodiment of a method for determining anisotropy for a build section of a wellbore.

Figure 1A:
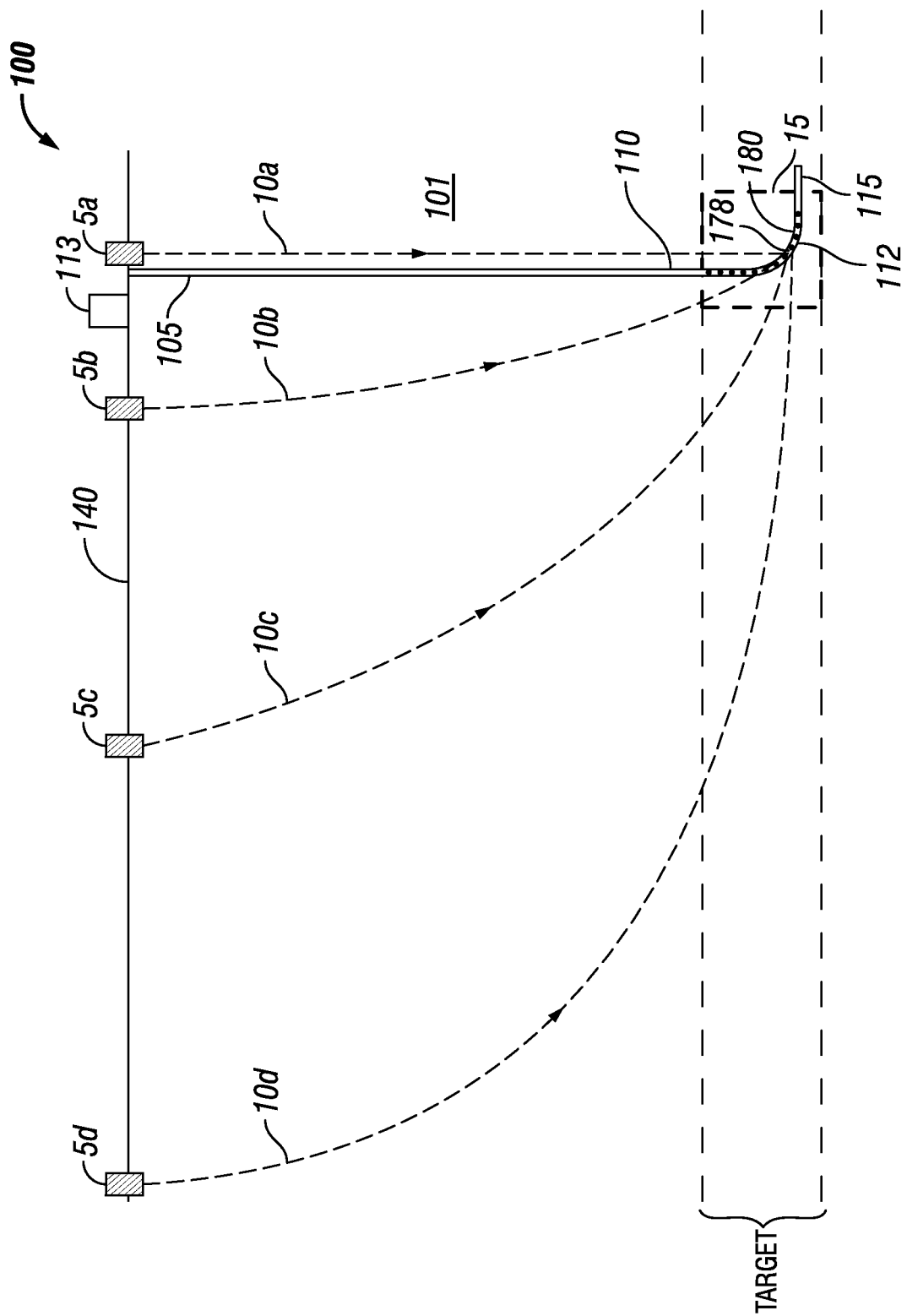
FIG. 1A is a diagram of one embodiment of a system for seismic surveying, including a plurality of seismic sources, a plurality of seismic sensors illustrated as a fiber optic cable, a plurality of seismic waves, and wellbore with a build section in accordance with the disclosure.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

DETAILED DESCRIPTION

Terminology

The following terms will be used throughout the specification and will have the following meanings unless otherwise indicated.

"Subsurface" refers to practically anything below a surface, such as below the earth's surface, below the ocean's surface, below a water's surface, etc. The subsurface may include faults, fractures, overburdens, underburdens, salts, salt welds, rocks, sands, sediments, pore space, etc. The subsurface may be onshore, offshore (e.g., shallow water or deep water), etc. Indeed, it should be appreciated that the term "subsurface," as used herein, may include practically any geologic points or volume(s) of interest (such as a survey area).

Furthermore, the subsurface may include hydrocarbons, such as liquid hydrocarbons (also known as oil or petroleum), gas hydrocarbons (e.g., natural gas), a combination of liquid hydrocarbons and gas hydrocarbons, etc. One measure of the heaviness or lightness of a liquid hydrocarbon is American Petroleum Institute (API) gravity. According to this scale, light crude oil is defined as having an API gravity greater than 31.1° API (less than 870 kg/m3), medium oil is defined as having an API gravity between 22.3° API and 31.1° API (870 to 920 kg/m3), heavy crude oil is defined as having an API gravity between 10.0° API and 22.3° API (920 to 1000 kg/m3), and extra heavy oil is defined with API gravity below 10.0° API (greater than 1000 kg/m3). Light crude oil, medium oil, heavy crude oil, and extra heavy oil are examples of hydrocarbons. Thus, examples of hydrocarbons are many, and may include, conventional oil, heavy oil, natural gas, kerogen, bitumen, clathrates (or hydrates), etc.

The hydrocarbons may be recovered from the entire subsurface or from a portion of the subsurface. For example, the subsurface may be divided up into one or more hydrocarbon zones, and hydrocarbons can be recovered from each desired hydrocarbon zone. In some embodiments, one or more of hydrocarbon zones may even be shut in to increase hydrocarbon recovery from a hydrocarbon zone that is not shut in.

The hydrocarbons may be recovered from the subsurface using primary recovery (e.g., by relying on pressure to recover hydrocarbons), secondary recovery (e.g., by using water injection (also referred to as waterflooding) or natural gas injection to recover hydrocarbons), enhanced oil recovery (EOR), or any combination thereof. The term "enhanced oil recovery" refers to techniques for increasing the amount of hydrocarbons that may be extracted from the subsurface. Enhanced oil recovery may also be referred to as improved oil recovery or tertiary oil recovery.

Examples of EOR operations include, for example: (a) miscible gas injection (which includes, for example, carbon dioxide flooding), (b) chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding, surfactant-polymer (SP) flooding, or alkaline-surfactant-polymer flooding), (c) microbial injection, and (d) thermal recovery (which includes, for example, cyclic steam and steam flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

The hydrocarbons may be recovered from the subsurface using radio frequency (RF) heating. For example, at least one radio frequency antenna may be utilized to increase the temperature of the oil and reduce the oil's viscosity. The oil can then be produced from the subsurface with an improved oil flow rate. Radio frequency may also be used in combination with at least one other recovery technique, such as steam flooding, as described in U.S. Pat. No. 9,284,826, which is incorporated by reference in its entirety.

The hydrocarbons may be recovered from the subsurface using fracturing. For example, fracturing may include hydraulic fracturing, fracturing using electrodes such as described in U.S. Pat. No. 9,840,898, etc. Fracturing may also be used in combination with at least one other recovery technique. Fracturing may be used to recover hydrocarbons from new reservoirs. Fracturing may also be used to help recover hydrocarbons from mature fields, for example, by waterflooding or steamflooding the mature fields after fracturing the mature fields. Mature fields are broadly defined as hydrocarbon fields where production has already peaked and production is currently declining.

The subsurface, the hydrocarbons, or both may also include non-hydrocarbon items. For example, non-hydrocarbon items may include connate water, brine, tracers, items used in enhanced oil recovery (e.g., polymer and fluid used in chemical enhanced oil recovery), items from other types of treatments (e.g., gels used in conformance control), etc.

In short, each subsurface may have a variety of characteristics, such as petrophysical rock properties, reservoir fluid properties, reservoir conditions, or any combination thereof. For example, each subsurface may be associated with one or more of: temperature, porosity, permeability, water composition, mineralogy, hydrocarbon type, hydrocarbon quantity, reservoir location, pressure, etc. Indeed, those of ordinary skill in the art will appreciate that the characteristics are many, including, for example: tight gas, shale gas, tight oil, tight carbonate, diatomite, geothermal, coalbed methane, a methane hydrate containing subsurface, a mineral containing subsurface, a metal containing subsurface, a subsurface having a permeability in the range of 0.01 microdarcy to 10 millidarcy, a subsurface having a permeability in the range of 10 millidarcy to 40,000 millidarcy, etc. The term "subsurface" may be used synonymously with the term "reservoir" or "formation". The terms "subsurface," "hydrocarbon," and the like are not limited to any description or configuration described herein.

"Wellbore" refers to a single hole for use in hydrocarbon recovery. For example, a wellbore may be a cylindrical hole drilled into the subsurface such that the wellbore is surrounded by the subsurface. The wellbore may also be perforated for fluidic communication with the subsurface. The wellbore may be used for injection in some embodiments. The wellbore may be used for production in some embodiments. The wellbore may be used for fracturing in some embodiments. The wellbore may be used for a single function, such as only injection, in some embodiments. The wellbore may be used for a plurality of functions, such as both injection and production in some embodiments. Oftentimes, the hydrocarbons may be swept from a single injection wellbore towards at least one production wellbore and then up towards the surface. A plurality of wellbores (e.g., tens to hundreds of wellbores) are oftentimes used to recover hydrocarbons from the subsurface.

The wellbore may include a plurality of components, such as, but not limited to, a casing, a liner, a tubing string, a heating element, a wellhead, a tree, a sensor, a packer, a screen, a gravel pack, etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the subsurface, producing a fluid from the subsurface, or any combination thereof. The casing may be cemented into the wellbore with the cement placed in the annulus between the subsurface and the outside of the casing. The tubing string and the liner are typically not cemented in the wellbore. The wellbore may also include any completion hardware that is not discussed separately. If the wellbore is drilled offshore, for example, the wellbore may include some of the previous components plus other components such as a riser, an umbilical, a subsea manifold, a subsea tree, remotely operated vehicle (ROV), etc.

The wellbore may have vertical, horizontal, or combination trajectories. For example, the wellbore may be a vertical wellbore, a horizontal wellbore, a multilateral wellbore, an inclined wellbore, a slanted wellbore, etc.

The wellbore may include a "build section." "Build section" refers to practically any section of a wellbore where the deviation is changing. As an example, the deviation is changing when the wellbore is curving. In a horizontal wellbore, the build section is the curved section between the vertical section of the horizontal wellbore and the horizontal section of the horizontal wellbore. Wellbores that are not horizontal wellbores may also include a build section. For example, inclined or slanted wellbores may each include a build section. In some embodiments, a build section may exist in a wellbore when there is a deviation in the order of at least one seismic wave. In short, a section of a wellbore where the wellbore's angle is changing may be referred to as a "build section". Of note, those of ordinary skill in the art will appreciate that the build section of the wellbore may also include the subsurface in the vicinity of the build section of the wellbore in some embodiments.

The wellbore may be drilled into the subsurface using practically any drilling technique and equipment known in the art, such as geosteering, directional drilling, etc. For example, drilling the wellbore may include using a tool such as a drilling tool. The drilling tool may include a drill bit and a drill string. Drilling fluid may be used while drilling. One or more tools may additionally be used while drilling or after drilling, such as measurement-while-drilling (MWD) tools, seismic-while-drilling (SWD) tools, wireline tools, logging-while-drilling (LWD) tools, or other downhole or reservoir tools. After drilling to a predetermined depth, the drill string and drill bit are removed, and then the casing, the tubing, etc. may be installed according to the design of the wellbore.

Some embodiments of wellbores may also be found in U.S. Patent Application Publication No. 2014/0288909 and U.S. Patent Application Publication No. 2017/0058186, each of which is incorporated by reference in its entirety. The term "wellbore" may be used synonymously with the terms "borehole," "well," or "well bore." The term "wellbore" is not limited to any description or configuration described herein.

As used in this specification and the following claims, the term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software, or any combination thereof.

Unless defined otherwise, all technical and scientific terms used herein have the same meanings as commonly understood by one of skill in the art to which the disclosed invention belongs. All citations referred herein are expressly incorporated by reference.

Provided herein are embodiments of a system for performing a seismic survey. In some embodiments, the system comprises: a plurality of seismic sources to send a plurality of seismic waves, at different angles, towards a plurality of seismic sensors proximate to a build section of a wellbore that is drilled into a subsurface. The subsurface is essentially homogenous proximate to the build section. Locations of the plurality of seismic sources relative to locations of the plurality of seismic sensors are such that the plurality of seismic waves are essentially planar at the plurality of seismic sensors. The system further comprises the plurality of seismic sensors to record seismic data for the plurality of seismic waves received at the plurality of seismic sensors from the plurality of seismic sources.

Advantageously, the embodiments provided herein may be utilized to record seismic data for the build section of the wellbore. Those of ordinary skill in the art may appreciate that traditional wireline seismic arrays used for Vertical Seismic Profiles (VSPs) are not typically deployed over the build section of the wellbore due to logistical reasons, such as potential damage to the traditional wireline seismic arrays while lowering or retrieving from the wellbore. Therefore, traditional wireline seismic arrays record little to no seismic data for the build section of the wellbore. On the other hand, the embodiments provided herein target the build section of the wellbore and they may be used to record seismic data for the build section of the wellbore. Moreover, the embodiments provided herein may be used to generate a digital seismic image that more accurately represents the subsurface. The embodiments provided herein may also be used to determine at least one stress value, which may be used to generate a more accurate stress model.

Advantageously, the embodiments provided herein may be utilized to determine anisotropy for a build section of a wellbore by determining at least one anisotropic parameter value. As discussed hereinabove, traditional wireline seismic arrays record little to no seismic data for the build section of the wellbore. Anisotropy has been traditionally estimated from walkaway vertical seismic profile (VSP) data, where a set of seismic sensors are deployed in a wellbore and seismic sources are deployed at several different offsets, but this traditional technique can require a horizontally layered overburden in order to determine anisotropy. On the other hand, the embodiments provided herein may be used to determine anisotropy even when the overburden is not horizontally layered. For example, the condition (a) that the subsurface is essentially homogenous proximate to the build section and the condition (b) that the locations of the plurality of seismic sources relative to the locations of the plurality of seismic sensors are such that the plurality of seismic waves are essentially planar at the plurality of seismic sensors allow for anisotropy to be determined as explained herein even when the overburden is not horizontally layered. The determined anisotropy may be used to generate a digital seismic image that more accurately represents the subsurface. The determined anisotropy may also be used to determine at least one stress value, which may be used to generate a more accurate stress model.

Advantageously, the embodiments provided herein may be utilized to determine both a horizontal slowness component value and a vertical slowness component value, that is, a slowness vector, for a seismic wave. As will be discussed further herein, the horizontal slowness component values and the vertical slowness component values of different seismic waves may be utilized to determine the anisotropy. Furthermore, the embodiments provided herein may process the seismic data in the common shot domain and do not require static corrections. Furthermore, the embodiments provided herein may be used with a variety of seismic sensor types, such as, but not limited to, Distributed Acoustic Systems that use a fiber optic (FO) cable. The FO cable may be deployed in the build section of the wellbore to overcome the logistical issues of traditional wireline methods.

Those of ordinary skill in the art will appreciate, for example, that the more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit, such as a clathrate (also referred to as hydrate) deposit. The more accurate digital seismic image may delineate more accurately the bounds of the clathrate deposit so that the clathrate deposit may be produced or avoided depending on the desired outcome.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Continuing with the clathrate deposit example, if the decision is made to produce the clathrate deposit indicated by the more accurate digital seismic image, those of ordinary skill in the art will appreciate that decisions about (a) where to drill one or more wellbores to produce the clathrate deposit, (b) how many wellbores to drill to produce the clathrate deposit, etc. may be made based on the more accurate digital seismic image. The more accurate digital seismic image may even be utilized to select the trajectory of each wellbore to be drilled. Moreover, if the delineation indicates a large clathrate deposit, then a higher number of wellbore locations may be selected and that higher number of wellbores may be drilled, as compared to delineation indicating a smaller clathrate deposit. If the decision is made to avoid the clathrate deposit indicated by the more accurate digital seismic image, those of ordinary skill in the art will appreciate that the bounds of the clathrate deposit may be used to make decisions about (a) where not to drill wellbores or where to drill wellbores so as to avoid the clathrate deposit, (b) how many wellbores to drill to avoid the clathrate deposit, etc.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. Continuing with the clathrate deposit example, a drilling tool may be steered to drill one or more wellbores to produce the clathrate deposit or steered to avoid the clathrate deposit depending on the desired outcome. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. Continuing with the clathrate deposit example, a variety of casing, tubing, packers, heaters, sand screens, gravel packs, items for fines migration, etc. may be selected for each wellbore to be drilled based on the more accurate digital seismic image. Furthermore, one or more recovery techniques to produce the clathrate deposit may be selected based on the more accurate digital seismic image. Some recovery techniques and devices, amongst many options, that may be selected to produce the clathrate deposit are provided in the following: U.S. Pat. Nos. 9,777,563, 7,812,203, U.S. Patent App. Pub. No. 2008/0102000, U.S. Pat. Nos. 7,964,150, 8,201,626, and 7,537,058, all of which are incorporated by reference in their entireties.

In short, those of ordinary skill in the art will appreciate that the seismic data and the anisotropy may be used for a variety of purposes. The seismic data recorded by the FO cables/FO sensors, for example, may be used for seismic imaging of the subsurface, seismic imaging of a subsurface volume of interest, 4D seismic monitoring (also called time-lapse seismic, Life of Field seismic, and Permanent Reservoir Monitoring, among other names) of the subsurface, etc. The more accurate digital seismic image may replace a previously generated seismic image that is less accurate. The more accurate digital seismic image, or the determined anisotropy, may be used to correct a previously generated seismic image that is less accurate. In short, those of ordinary skill in the art will appreciate that there are many decisions (e.g., steering decisions, landing decisions, completion decisions, etc.) to make in the hydrocarbon industry and making proper decisions based on the seismic data, the determined anisotropy by the determined anisotropic value(s), the determined stress value(s), the more accurate digital seismic image, the more accurate stress model, or any combination thereof should improve the likelihood of safe and reliable operations.

For simplicity, the many possibilities, including wellbore location, component selection for the wellbore, recovery technique selection, controlling flow of fluid, etc., may be collectively referred to as managing a subsurface reservoir.

System Overview:

Provided herein are embodiments of a system for performing a seismic survey. In some embodiments, the system comprises: a plurality of seismic sources to send a plurality of seismic waves, at different angles, towards a plurality of seismic sensors proximate to a build section of a wellbore that is drilled into a subsurface. The subsurface is essentially homogenous proximate to the build section. Locations of the plurality of seismic sources relative to locations of the plurality of seismic sensors are such that the plurality of seismic waves are essentially planar at the plurality of seismic sensors. The system further comprises the plurality of seismic sensors to record seismic data for the plurality of seismic waves received at the plurality of seismic sensors from the plurality of seismic sources.

Seismic Source:

A "seismic source" refers to a device that sends at least one seismic wave through a medium. Seismic waves are sound waves. The seismic source may be deployed from a surface, such as on a terrestrial surface or on an aquatic surface. One embodiment of a seismic source is an air gun. One embodiment of a seismic source is a vibroseis. A vibroseis source is deployed on a vehicle and uses a plate in connection with the ground that transmits controlled vibrations into the subsurface. One embodiment of a seismic source is compatible with a fiber optic (FO) sensor, for example, compatible with a FO point sensor. One embodiment of a seismic source is compatible with a FO cable.

In some embodiments, a plurality of seismic sources are utilized to generate a plurality of seismic waves that propagate into the medium. The plurality of seismic sources may be of the same type, or alternatively, the plurality of seismic sources may be a combination of different types of seismic sources. As discussed herein, the plurality of seismic sources send a plurality of seismic waves, at different angles, towards a plurality of seismic sensors proximate to a build section of a wellbore that is drilled into a subsurface.

The location of a seismic source affects propagation of seismic waves sent from that seismic source. Assume there is a seismic source directly above a subsurface, the seismic wave may travel vertically downwards and the angle relative to the vertical is 0 degrees. As the offset increases, meaning that the seismic sources are located farther away from the seismic sensors, the seismic waves travel obliquely down into the subsurface and the angles increases. In the case of an isotropic homogenous subsurface, the offset of a seismic source to get a seismic wave having a 30 degree angle at a seismic sensor may be directly computed from depth*(tan 30), and so on. However, with an anisotropic heterogeneous subsurface, it is not so simple and the seismic sources should be located such that the seismic waves sent from those seismic sources are far enough away that the seismic waves will be essentially planar at the seismic sensors. The "planarity" could be assessed in the degree to which the equations are fit to the picked arrival times to estimate the horizontal and vertical slownesses. As discussed further herein, it is desirable that the locations of the plurality of seismic sources relative to the locations of the plurality of seismic sensors are such that the plurality of seismic waves are essentially planar at the plurality of seismic sensors. If a location of a seismic source relative to a location of seismic sensor will not lead to an essentially planar seismic wave at that seismic sensor, then, for example, that seismic source should be repositioned to a different location in order to lead to an essentially planar seismic wave at the seismic sensor.

Those of ordinary skill in the art will appreciate that this disclosure provides embodiments of specific configurations of the plurality of seismic sources and the plurality of seismic sensors that reduces or eliminates many of the complications inherent in conventional methods. Moreover, those of ordinary skill in the art will appreciate that this disclosure provides an improved way of utilizing these seismic sources and these seismic sensors to determine seismic data for the build section of the wellbore, determining anisotropy, and generating a more accurate digital seismic image, among other functionality. The terminology "essentially planar seismic waves" refers to a seismic arrival whose wavefront is essentially a plane. The term "seismic source" may be used synonymously with the term "source."

The term "seismic source" is not limited to any description or configuration described herein.

Turning to FIGS. 1A, 1B-1, 1B-2, 1B-3, 1B-4, 1C, one embodiment of a system 100 for seismic surveying includes at least one seismic source 5 (e.g., seismic sources 5a-5d) on a surface 140 to send at least one seismic wave (e.g., seismic waves 10a-10d), at different angles, towards a plurality of seismic sensors (e.g., FO cable 178 and one embodiment of the FO cable 178 is capillary tubing 180) proximate to a build section 112 of a wellbore 105 that is drilled into a subsurface 101. The location of the source 5a leads to the seismic wave 10a with an angle of 0 degrees, the location of the seismic source 5b leads to the seismic wave 10b with an angle of 30 degrees, the location of the seismic source 5c leads to the seismic wave 10c with an angle of 60 degrees, and the location of the seismic source 5d leads to the seismic wave 10d with an angle of 90 degrees. The seismic wave 10a has a vertical arrival and the seismic wave 10d has a horizontal arrival. The FO cable 178/the capillary tubing 180 includes a plurality of sensing portions such as a plurality of seismic sensors (e.g., seismic sensors 182a-182x). The locations of the seismic sources 5a-5d relative to the location of the capillary tubing 180 are such that the seismic waves 10a-10d are essentially planar at the capillary tubing 180, as illustrated in FIGS. 2A-1, 2B-1, 2C-1, 2D-1. Of course, those of ordinary skill in the art will appreciate that the seismic waves 10a-10d are not necessarily all arriving at once, but rather, they are arriving from different shot positions.

Some embodiments may have a different quantity (e.g., more than or less than) than the illustrated quantity of seismic sources, seismic waves, seismic sensors, or any combination thereof. Similarly, some embodiments may locate seismic sources and seismic sensors at different locations, and seismic waves may have different angles than illustrated as long as the seismic waves are essentially planar at the seismic sensors.

Seismic Sensor:

A "seismic sensor" refers to a device that records seismic data for a seismic wave received at the seismic sensor. For example, the seismic sensor records the arrival time. One embodiment of a seismic sensor is a geophone. One embodiment of a seismic sensor is an accelerometer. One embodiment of a seismic sensor is a hydrophone. One embodiment of a seismic sensor is a FO sensor, for example, a FO point sensor. One embodiment of a seismic sensor is a FO cable.

In some embodiments, a plurality of seismic sensors are utilized to record seismic data for a plurality of seismic waves received at the plurality of seismic sensors. The plurality of seismic sensors may be of the same type, or alternatively, the plurality of seismic sensors may be a combination of different types of seismic sensors. The FO cable may be considered an example of a plurality of seismic sensors because the FO cable has a plurality of sensing portions such as a plurality of seismic sensors (e.g., as illustrated in FIG. 1C).

The plurality of seismic sensors may be installed proximate to a build section of a wellbore that is drilled into a subsurface. The subsurface is essentially homogenous proximate to the build section. The terminology "essentially homogenous" refers to little variation or no variation in the subsurface. For example, the subsurface is essentially homogenous proximate to the build section when faults are not present, when discontinuities are not present, etc. Logs may be utilized to determine if a subsurface is essentially homogenous, and it may be based on the order of a seismic wavelength which is a function of the velocity and frequency of the seismic wave. Of course, those of ordinary skill in the art will appreciate that other techniques may be utilized to determine whether a subsurface is essentially homogenous. The plurality of seismic sensors may be installed proximate to the build section only, or proximate to the build section and at least one other portion of the wellbore.

Referring to a FO cable, in one embodiment, the FO cable may be deployed proximate to the build section only. As another example, the FO cable may be deployed proximate to the build section and proximate to at least one other portion of the wellbore (e.g., the vertical section of the wellbore, the horizontal section of the wellbore, or both). The FO cable may be deployed from a terrestrial surface, the FO cable may be deployed from an aquatic surface (e.g., deployed from a platform or FPSO (Floating, Production, Storage, and Offloading vessel)), etc. Deployment of a FO cable in a marine environment is discussed further in U.S. patent application Ser. No. 15/725,391, which is incorporated by reference in its entirety.

The FO cable performs distributed acoustic sensing (DAS) to sense the plurality of seismic waves. However, in some embodiments, the FO cable may also perform distributed temperature sensing (DTS). In some embodiments, the FO cable may also perform distributed pressure sensing (DPS). Indeed, the FO cable may perform distributed acoustic sensing, distributed temperature sensing, distributed pressure sensing, or any combination thereof.

The FO cable includes at least one optical fiber that may be surrounded by at least one protective layer to shield the at least one optical fiber against the environment. One embodiment of the FO cable comprises a capillary tubing (also referred to as capillary tube) to house the at least one optical fiber. The at least one optical fiber may be, but is not limited to: one or more optical fibers used for DAS, one or more optical fibers used for DTS, one or more optical fibers for DPS, or any combination thereof. The at least one optical fiber may include multimode optical fibers, single mode optical fibers, etc. In one embodiment, a single capillary tubing is used, which contains a plurality of optical fibers. In another embodiment, multiple capillary tubings may be used, with each capillary tubing containing one or more optical fibers.

Each DAS optical fiber may be optically interrogated by one or more input pulses, to provide substantially continuous sensing of vibrational activity along its length. A DAS interrogation box, for example, at the surface may be connected to the DAS optical fiber. The DAS optical fiber may be either single-mode or multimode. In some embodiments, the term "acoustic" may be taken to mean any type of mechanical vibration or pressure wave, including seismic waves and sounds from sub-Hertz to 20 KHz. Optical pulses are launched into the DAS optical fiber and the radiation backscattered from within the DAS optical fiber is detected and analyzed. Rayleigh backscattering analysis is used to quantify vibration, seismic waves, or sound. By analyzing the radiation backscattered within the DAS optical fiber, the DAS optical fiber can effectively be divided into a plurality of discrete sensing portions which may be (but do not have to be) contiguous. Within each discrete sensing portion, mechanical vibrations of the DAS optical fiber, for instance from seismic sources, cause a variation in the amount of Rayleigh backscatter from that portion. This variation can be detected and analyzed and used to give a measure of the acoustic spectrum intensity of disturbance of the DAS optical fiber at that sensing portion. Besides the intensity (amplitude) and distance, other factors that can be measured include frequency, phase, duration, and signal evolution of the transients. In one embodiment, an unmodified, substantially continuous length of standard optical fiber may be used, requiring little or no modification or preparation for use as the DAS optical fiber.

The DAS optical fiber, and other optical fibers, may be inside the capillary tubing. The capillary tubing may be filled with a fluid, e.g., a hydrogen scavenging gel, an inert heat transfer fluid, or an inert gas. In one embodiment, the filling fluid is a gel designed to scavenge hydrogen and protect the at least one optical fiber from hydrogen darkening. The gel also helps to support the weight of the at least one optical fiber within the capillary tubing. In another embodiment, the capillary tubing is filled with an inert gas such as nitrogen to avoid exposure of the at least one optical fiber to water or hydrogen, thereby minimizing any hydrogen-induced darkening of the at least one optical fiber during oilfield operations.

A variety of installation options may be utilized: permanent, pumpable, or temporary. With the pumpable option, two capillary tubings are used to enable pumping fluid to be pumped down the capillary tubing and returned to the surface. A turnaround sub with a U-tube geometry is used at the deepest wellbore placement to join the two capillary tubings and enable pumping. The viscous drag force of the pumped fluid on the at least one optical fiber enables recovery and replacement. The pumping of the at least one optical fiber may occur in a factory, controlled surface environment, or at the wellsite with the at least one optical fiber in the wellbore. The pumpable option may be used if one or two optical fibers are used. The pumpable option allows the at least one optical fiber to be recovered and replaced should it experience hydrogen darkening.

With the permanent option, at least one optical fiber is installed inside a capillary tubing in a factory or controlled environment. If a permanently installed optical fiber becomes damaged due to hydrogen darkening or thermal degradation, the recourse is a complete replacement. The permanent and pumpable options may strap or clamp the capillary tubing to the outside of casing, liners, and tubing, or installed inside a coiled tubing instrument tube.

With the temporary option, at least one optical fiber is run into a wellbore off a reeling system into the tubing or into a coiled tubing instrument tube. The coiled tubing instrument tube could be free hanging in the tubing-casing annulus or strapped to the tubing, casing, or liner. The temporary deployable optical fiber may use a small diameter FIMT (fiber in metal tube) with an outside diameter of 0.09 to 0.15 inches, which is reinforced with fiber glass, polyproylene, polyethylene, carbon fiber, or any combinations of the foregoing which encases and protects the FIMT. This temporary option is designed to be run in and out of many wellbores and installed for a few hours to a few weeks to acquire data.

Some installation options may depend on whether the wellbore is existing or new. In one embodiment, for an existing wellbore, installation may be inside the liner or casing on the tubing or coiled tubing to take advantage of the preexisting structure. However, for a newly drilled wellbore, installation may be either inside or outside the liner or casing with trade-offs between cost, risk, etc.

In short, those of ordinary skill in the art will appreciate that various installation options are available. In one embodiment, the capillary tubing may be attached to the outer surface of the tubing with a plurality of clamps, or any known method for coupling conduits. Further, in some embodiments, it should be appreciated that the capillary tubing need not be coupled to the tubing, but it may be coupled to any other conduits in the wellbore or the casing/liner itself, or it may be integral with the casing/liner, e.g., the capillary tubing may be positioned in the annulus, clamped/strapped/fastened to any of the tubing, inside the tubing, the liner, the casing, the instrument coiled tubing, or any combination thereof. Thus, the installation scheme that is chosen may depend upon whether the wellbore is new or preexisting, components of the wellbore, etc.

Turning to FIGS. 1A, 1B-1, 1B-2, 1B-3, 1B-4, 1C, in the system 100, the seismic sources 5a-5d send the seismic waves 10a-10d towards a plurality of seismic sensors, such as the FO cable 178 illustrated as the capillary tubing 180, proximate to the build section 112 of the wellbore 105 that is drilled into the subsurface 101. The locations of the seismic sources 5a-5d relative to the location of the capillary tubing 180 are such that the seismic waves 10a-10d are essentially planar at the capillary tubing 180, as illustrated in FIGS. 2A-1, 2B-1, 2C-1, 2D-1.

The FO cable 178/the capillary tubing 180 includes a plurality of sensing portions, such as the plurality of seismic sensors 182a-182x. For example, the FO cable 178/the capillary tubing 180 may comprise a 24-level downhole seismic sensor array with 24 seismic sensors spaced 20 m apart over the build section 112 with a build rate of 6.75 degrees/30 m. The 24 seismic sensors are within an optical fiber, such as a DAS optical fiber, within the FO cable 178/the capillary tubing 180 as discussed further hereinbelow. Two seismic sensors 182a-182b are located in the vertical section 110 of the wellbore 105, two seismic sensors 182w-182x are located in the horizontal section 115 of the wellbore 105, and the other seismic sensors 182c-182v are located in between these four seismic sensors.

Furthermore, the subsurface 101 in the box 15 is essentially homogenous proximate to the build section 112. Expanded views of box 15, including expanded views of the wellbore 105 and the capillary tubing 180, as well as various locations for the capillary tubing 180, are discussed at FIGS. 1D, 1E, 2A-1, 2A-2, 2B-1, 2B-2, 2C-1, 2C-2, 2D-1, 2D-2.

Some embodiments may include a different quantity of seismic sensors, a different location for one more of the seismic sensors, or any combination thereof. Although a FO cable is illustrated herein, other seismic sensors may be utilized in some embodiments (e.g., utilized with or without an FO cable). The quantity or delineation of the essentially homogenous subsurface proximate to the build section may differ in some embodiments.

Figures 1, 1B:
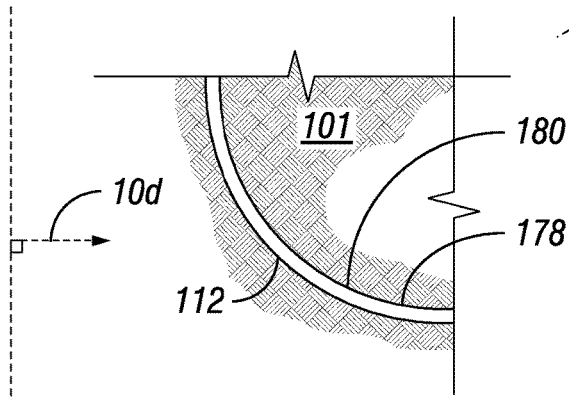
FIGS. 1B-1, 1B-2, 1B-3, 1B-4 are cross-sectional views of the plurality of seismic waves of FIG. 1A
Figures 1, 1B, 2, 3:
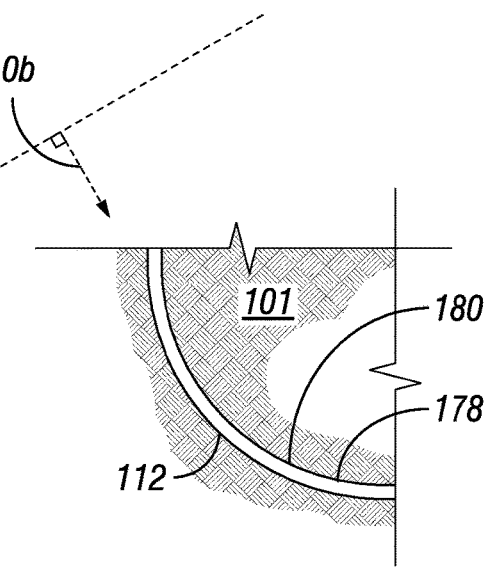
Figures 1, 1B, 2:
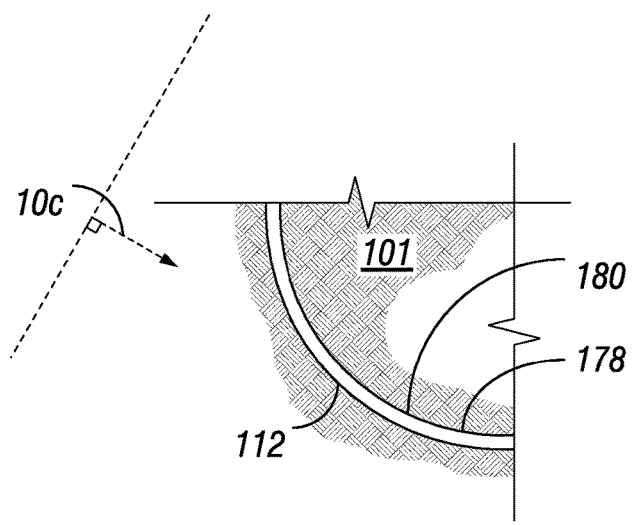
Figures 1, 1B, 2, 3, 4:
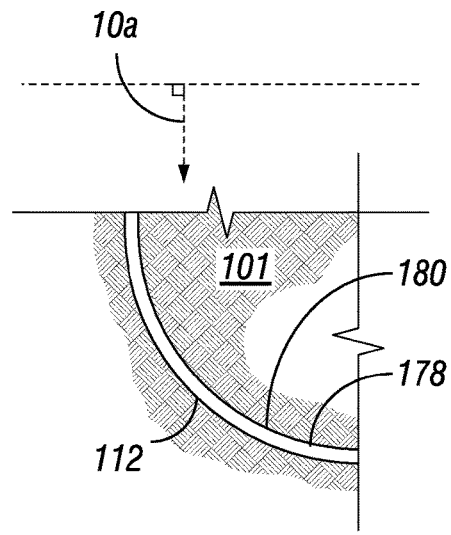
Figure 1C:
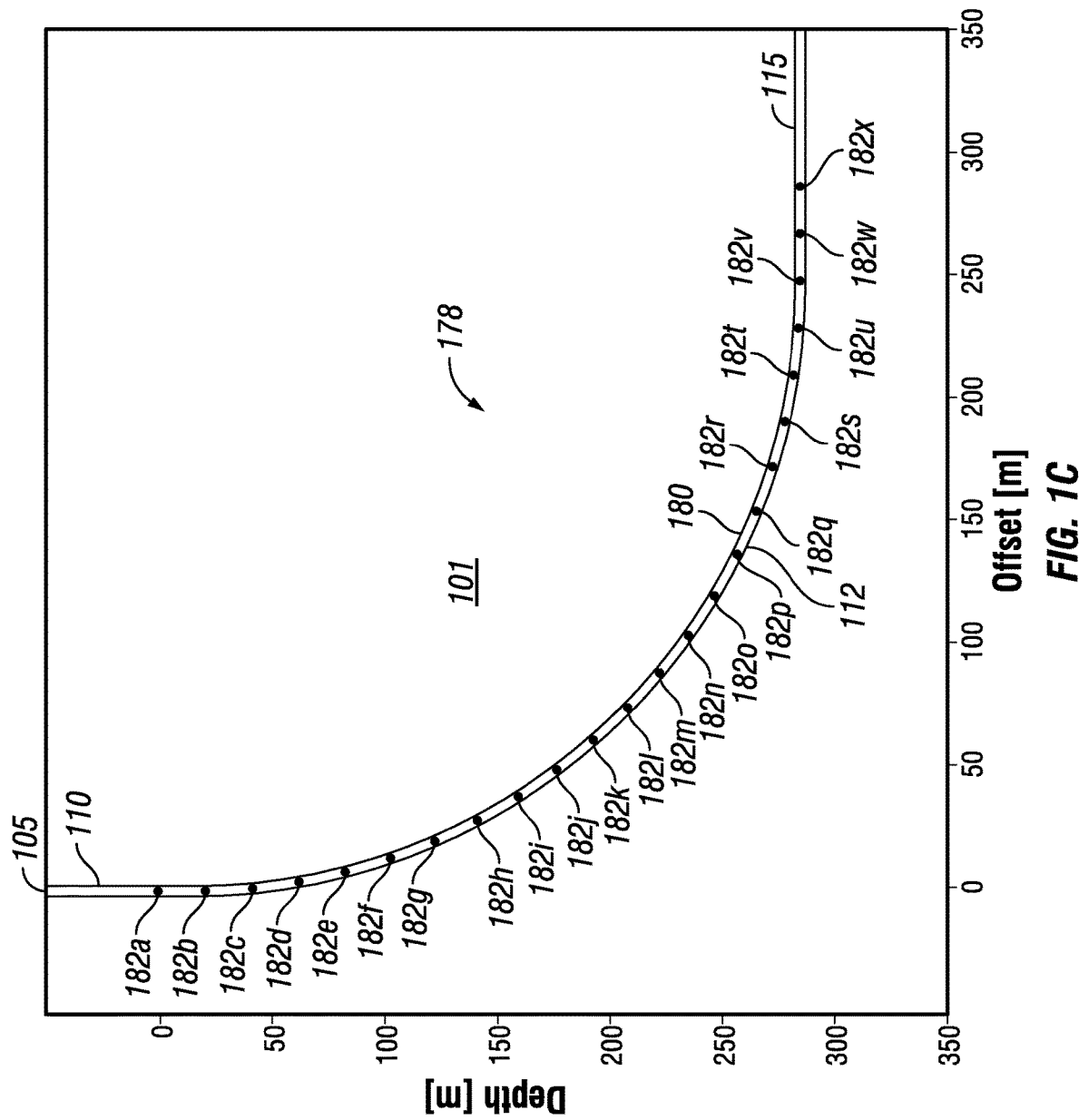
FIG. 1C is a cross-sectional view of the fiber optic cable of FIG. 1A.
Figure 1D:
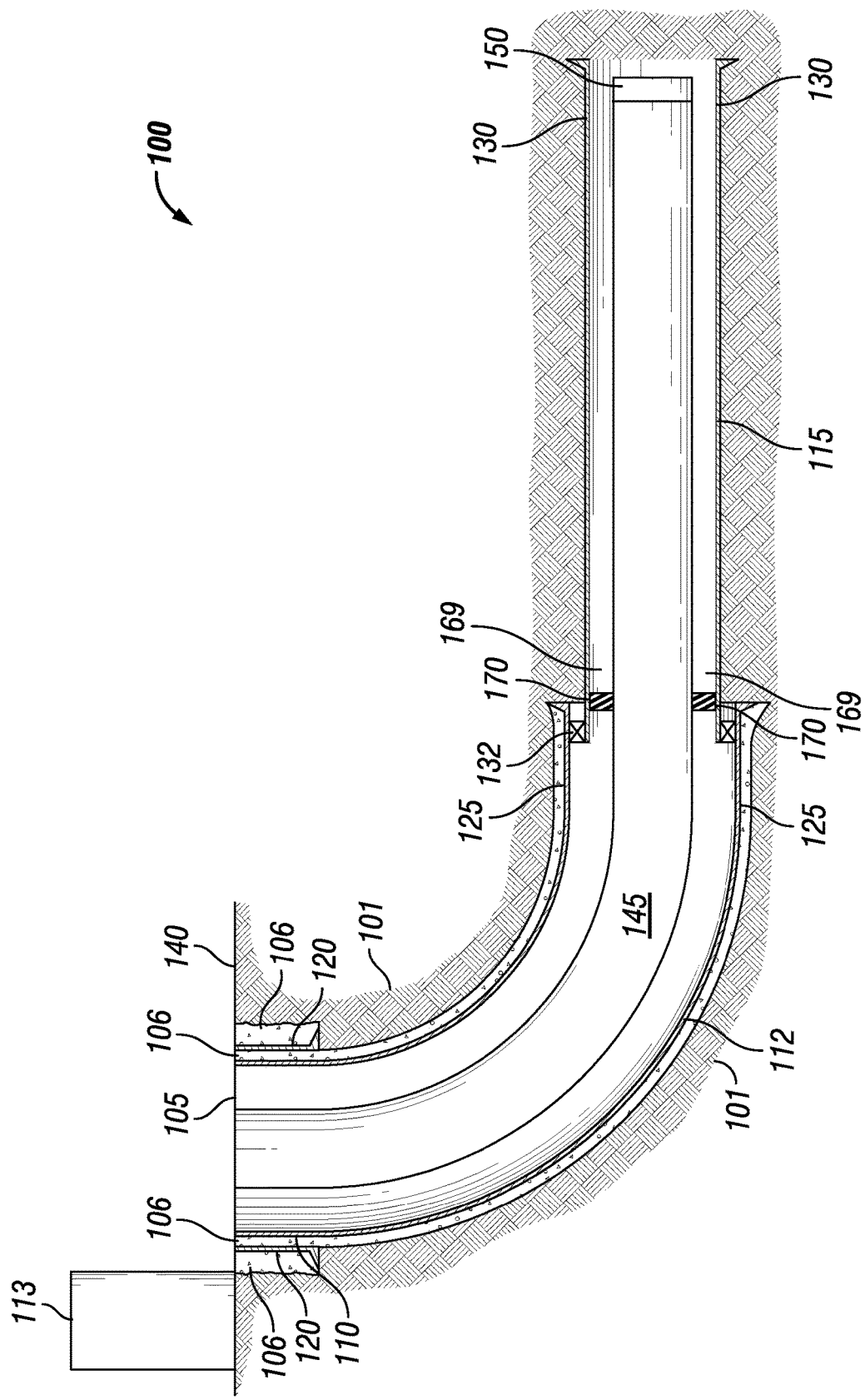
FIG. 1D is a cross-sectional view of the wellbore of FIG. 1A.

Wellbore:

FIG. 1D illustrates an expanded view, in cross-section, of the wellbore 105 of FIG. 1A. The wellbore 105 is a horizontal wellbore. The wellbore 105 includes a vertical section 110, the build section 112, and a horizontal section 115. The area between the vertical section 110 and the horizontal section 115 is referred to as the heel and the area towards the end of the horizontal section 115 is referred to as the toe. For example, unconventional reservoirs may be produced using horizontal wellbores, such as the wellbore 105, with medium radius build sections (also referred to as build sections) with build rates of 8 degrees/30 m (build radius 218 m and length of hole 343 m).

The wellbore 105 may be drilled with at least one tool 113. The tool 113 may include a drill bit, a drill string, etc. The tool 113 may be utilized to drill at least one other wellbore based on the more accurate seismic image generated with the embodiments herein. The wellbore 105 may be cemented as illustrated by cement 106. The system 100 may include a surface casing 120 along a portion of the wellbore

105, a production casing 125 along a portion of the wellbore 105, and a liner 130 (e.g., a slotted liner) attached by at least one liner hanger 132. The system 100 may also include a tubing 145 within the surface casing 120, the production casing 125, and the liner 130, which starts at the surface 140. The tubing 145 may be of standard sizes known in the industry (e.g., outermost diameter of 2⅜ inches to 4.5 inches) for standard and commonly known casing sizes (e.g., outermost diameter of 4½ inches to 12 inches), each of which have lengths in the tens to hundreds of feet. The tubing 145 includes a plurality of tubulars tubing joints, pup joints, packers (e.g., may include centralizers), etc. The end of the tubing 145 (e.g., at the toe) includes a bull plug 150. At least one packer 170 may be located in an annulus 169 between the tubing 145 and the liner 130.

In operation, the wellbore 105 may be utilized, for example, in steamflooding or waterflooding. For example, steam (e.g., from a steam injector) or water may enter the tubing 145, and the steam or water is injected into the adjacent subsurface 101 through flow control devices, perforations, etc. The wellbore 105 may be used for hydrocarbon production such that hydrocarbons from the subsurface 101 flow into the wellbore 105 and up towards the surface 140 for refining, transporting, etc.

Figure 1E:
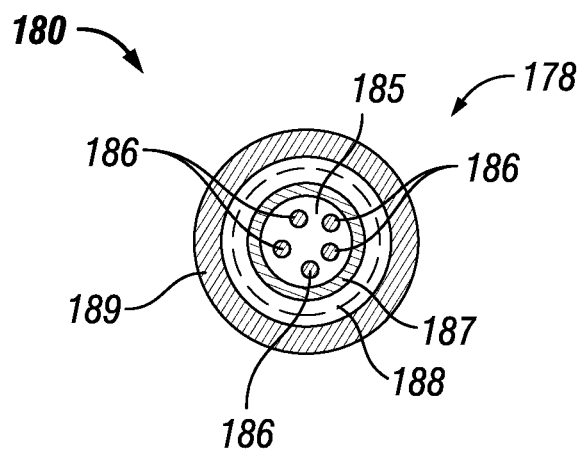
FIG. 1E is a cross-sectional view of a capillary tubing consistent with the fiber optic cable of FIG. 1A.

FO Cable—Capillary Tubing:

FIG. 1E illustrates an expanded view, in cross-section, of the capillary tubing 180 of FIG. 1A. The capillary tubing 180 may be installed in various locations in the system 100 of FIG. 1A. The capillary tubing 180 is one embodiment of the FO cable 178, however, those of ordinary skill in the art will appreciate that there are other designs and the appended claims are not limited to any disclosed embodiments. The capillary tubing 180 may have a length of tens of feet to hundreds of feet. The capillary tubing 180 may be practically the entire length of the wellbore 105. The outer diameter of the capillary tubing 180 may be about ⅛ inches to about ⅜ inches. The outer diameter of the capillary tubing 180 may be about ¼ inches. The dimensions of the capillary tubing 180 may vary, as long as some of the capillary tubing 180 is proximate to the build section 112.

Starting from the inside, the capillary tubing 180 includes a core 185 comprised of a first protective layer that is typically of an Inconel® or Incoloy® alloy 25, a stainless steel, or any combination thereof with at least one optical fiber 186 with at least one sensing portion (e.g., at least one seismic sensor) inside the core 185. One or more of the optical fibers 186 is a DAS optical fiber for distributed acoustic sensing, but other sensing capabilities, such as distributed pressure sensing, may be available in some embodiments. The optical fibers 186 may have high temperature coatings and coating combinations, including polyimide, high temperature acrylates, silicone-PFA, hermetic carbon, or any combination thereof to prevent hydrogen darkening. The core 185 may be filled with fluid, and the fluid surrounds each optical fiber 186. The fluid may be a gel or inert gas as discussed hereinabove. The inner diameter of the core 185 may be about 0.05 inches to about 0.10 inches. The combination of the first protective layer and the optical fiber(s) is commonly referred to as a FIMT or fiber in metal tube. The length of the core 185 depends on the length of the capillary tubing 180.

Adjacent to the core 185 may be an optional second protective layer 187, which may be of a metallic material such as aluminum. The diameter of the second protective layer 187 is optional, but may be about 0.10 inches to about 0.20 inches. The length of the second protective layer 187 depends on the length of the capillary tubing 180.

Adjacent to the optional second protective layer 187 may be a third protective layer 188, which may be of a metallic material (e.g., Inconel® or Incoloy® alloy 25, a stainless steel, or any combination thereof). The diameter of the third protective layer 188 may be about 0.20 inches to about 0.40 inches. The length of the third protective layer 188 depends on the length of the capillary tubing 180.

Adjacent to the third protective layer 188 may be an encapsulation protective layer 189, which is an extruded encapsulation polymer (e.g., polyethylene, polypropolyene, Teflon™ brand, Hypalon™ brand, or any combination thereof). The diameter of the encapsulation protective layer 189 may be about 0.25 inches to about 0.75 inches. The length of the encapsulation protective layer 189 depends on the length of the capillary tubing 180.

Figures 1, 2A:
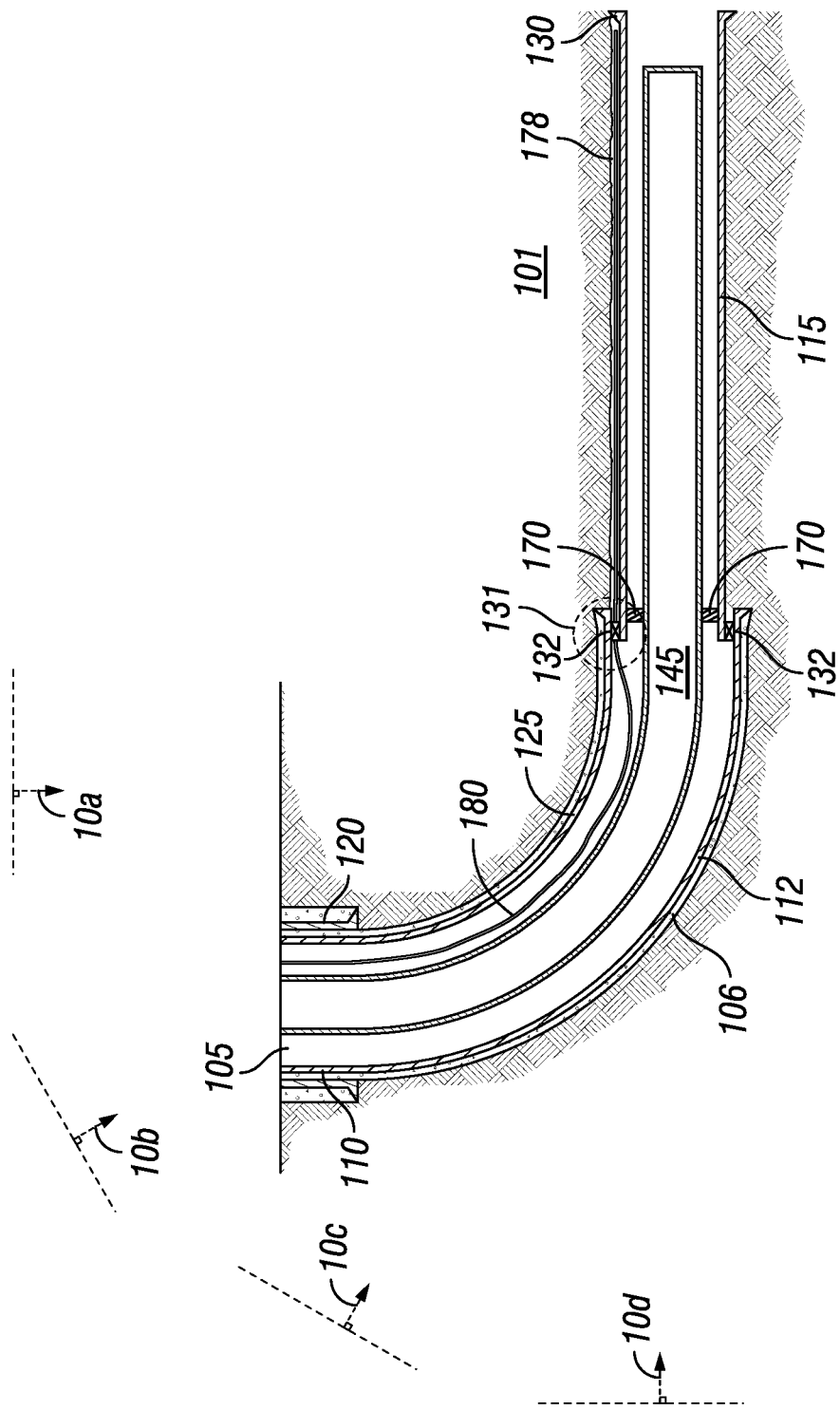
Figures 2, 2A:
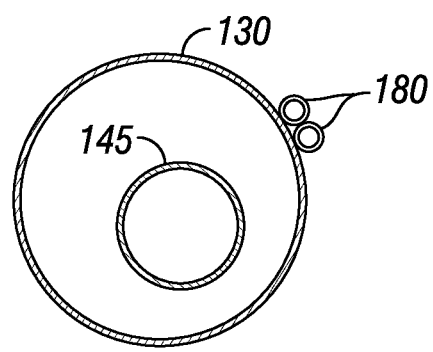

FO Cable—Capillary Tubing Clamped to Liner:

FIGS. 2A-1 and 2A-2 illustrate an embodiment with a hydraulic wet connect at liner top 131 with the capillary tubing 180 being clamped to the tubing 145 above the liner top 131. There may be one or more of the capillary tubing 180. In the embodiment of FIGS. 2A-1 and 2A-2, the capillary tubing 180 may be installed outside of the liner 130 in the horizontal section 115 of the wellbore 105, and clamped on the tubing 145 in the vertical section 110. The optical fiber 186 of FIG. 1E (e.g., the DAS fiber, etc.) may be permanently installed in the capillary tubing 180 or can be pumped and retrieved through pumping to/from the capillary tubing 180. The hydraulic wet connect is used to connect the optical fiber 186 in the horizontal section 115 and the vertical clamped section 110. The tubing 145 can be run in and out of the wellbore without damaging the optical fiber 186 in the horizontal section 115. This setup may include at least one packer 170.

Moreover, as illustrated in FIG. 2A-1, the capillary tubing 180 is proximate to the build section 112 of the wellbore 105 that is drilled into the subsurface 101. The subsurface 101 is essentially homogenous proximate to the build section 112. The locations of the plurality of seismic sources 5a-5d (FIG. 1A) relative to location of the capillary tubing 180 are such that the plurality of seismic waves 10a-10b are essentially planar at the capillary tubing 180.

Figures 1, 2B:
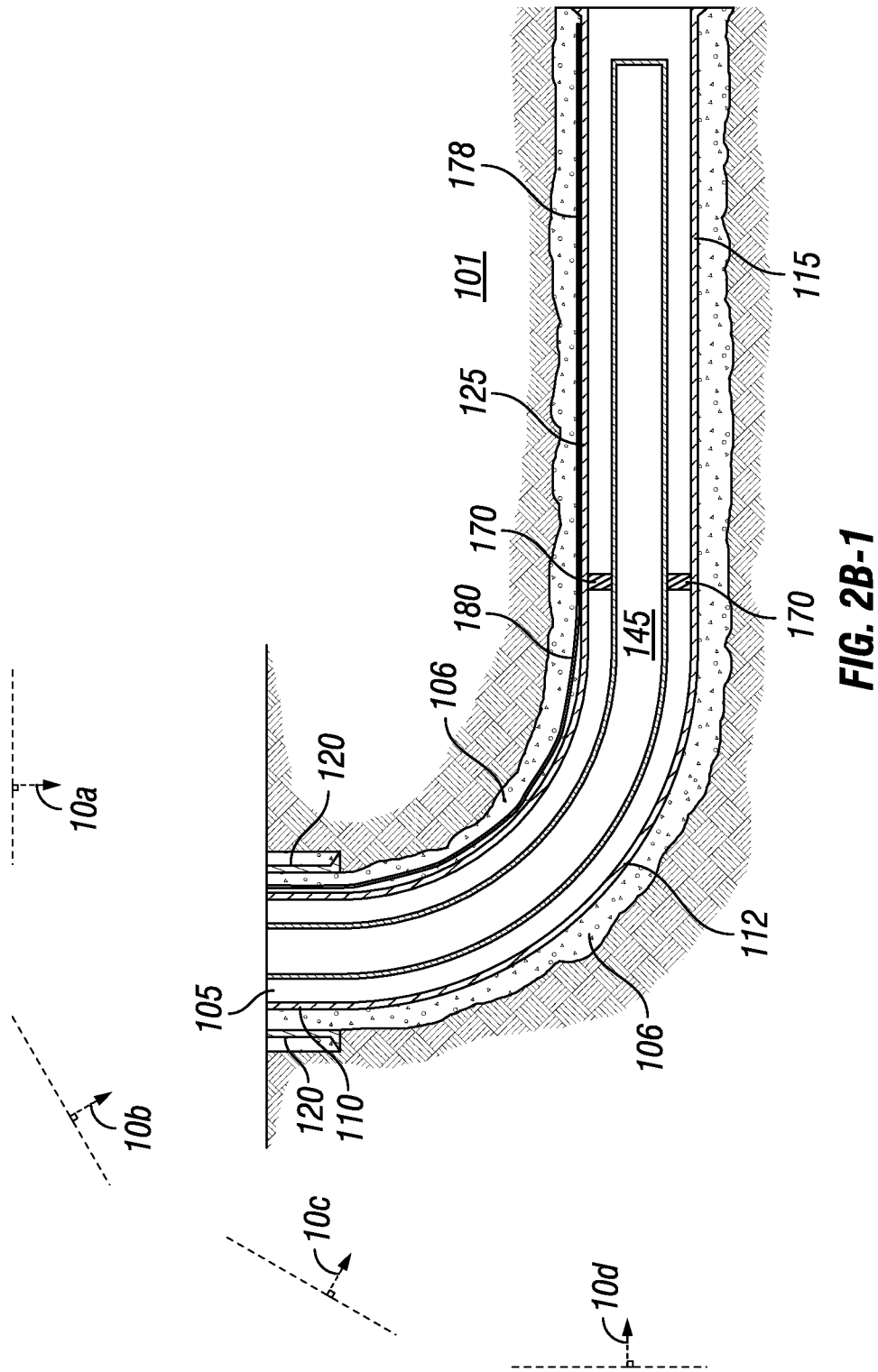
Figures 2, 2B:
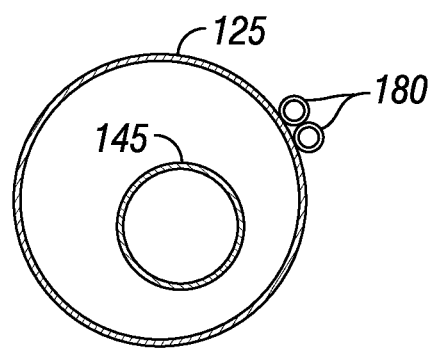

FO Cable—Capillary Tubing Clamped to Casing:

FIGS. 2B-1 and 2B-2 illustrate an embodiment in which the capillary tubing 180 may be clamped to the casing, such as the production casing 125. There may be one or more of the capillary tubing 180. The installation scheme of FIGS. 2B-1 and 2B-2 is similar to the liner deployed surveillance scheme of FIGS. 2A-1 and 2A-2. As illustrated, the complete system is installed outside of the casing 125. The capillary tubing 180 is clamped to the casing 125 as the casing 125 is installed into the wellbore 105. The optical fiber 186 may be retrieved and replaced when designed with the pumpable option. In another embodiment, a single capillary tubing 180 may be run with single or multiple permanent optical fibers 186. The perforations may be shot 180 degrees away from the capillary tubing 180. The capillary tubing 180 may be run with ½ inch steel cables on either side of the ¼ inch capillary tubing 180 to facilitate electro-magnetic orienting of perforating guns. This setup may include at least one packer 170.

Moreover, as illustrated in FIG. 2B-1, the capillary tubing 180 is proximate to the build section 112 of the wellbore 105 that is drilled into the subsurface 101. The subsurface 101 is essentially homogenous proximate to the build section 112. The locations of the plurality of seismic sources 5a-5d (FIG. 1A) relative to location of the capillary tubing 180 are such that the plurality of seismic waves 10a-10b are essentially planar at the capillary tubing 180.

Figures 2, 2C:
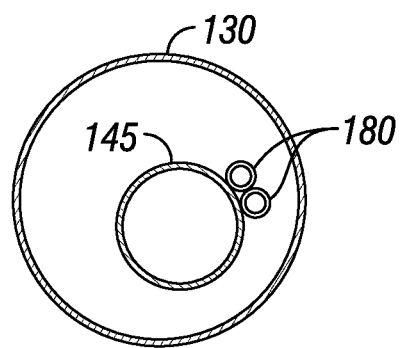

FO Cable—Capillary Tubing Clamped to Tubing:

FIGS. 2C-1 and 2C-2 illustrate an embodiment in which the capillary tubing 180 may be clamped to the tubing 145. There may be one or more of the capillary tubing 180. In one embodiment of this scheme, the capillary tubing 180 is only clamped on the tubing 145 and no other component. In another embodiment, the capillary tubing 180 may be installed inside the tubing 145. The installation scheme in this setup is flexible, which facilitates the changes in the optical fiber 186 design and specifications. Additionally, the optical fiber 186 and capillary tubing 180 are retrievable. This setup may include at least one packer 170, and the capillary tubing 180 may penetrate through each packer 170.

Moreover, as illustrated in FIG. 2C-1, the capillary tubing 180 is proximate to the build section 112 of the wellbore 105 that is drilled into the subsurface 101. The subsurface 101 is essentially homogenous proximate to the build section 112. The locations of the plurality of seismic sources 5a-5d (FIG. 1A) relative to location of the capillary tubing 180 are such that the plurality of seismic waves 10a-10b are essentially planar at the capillary tubing 180.

Figures 1, 2D:
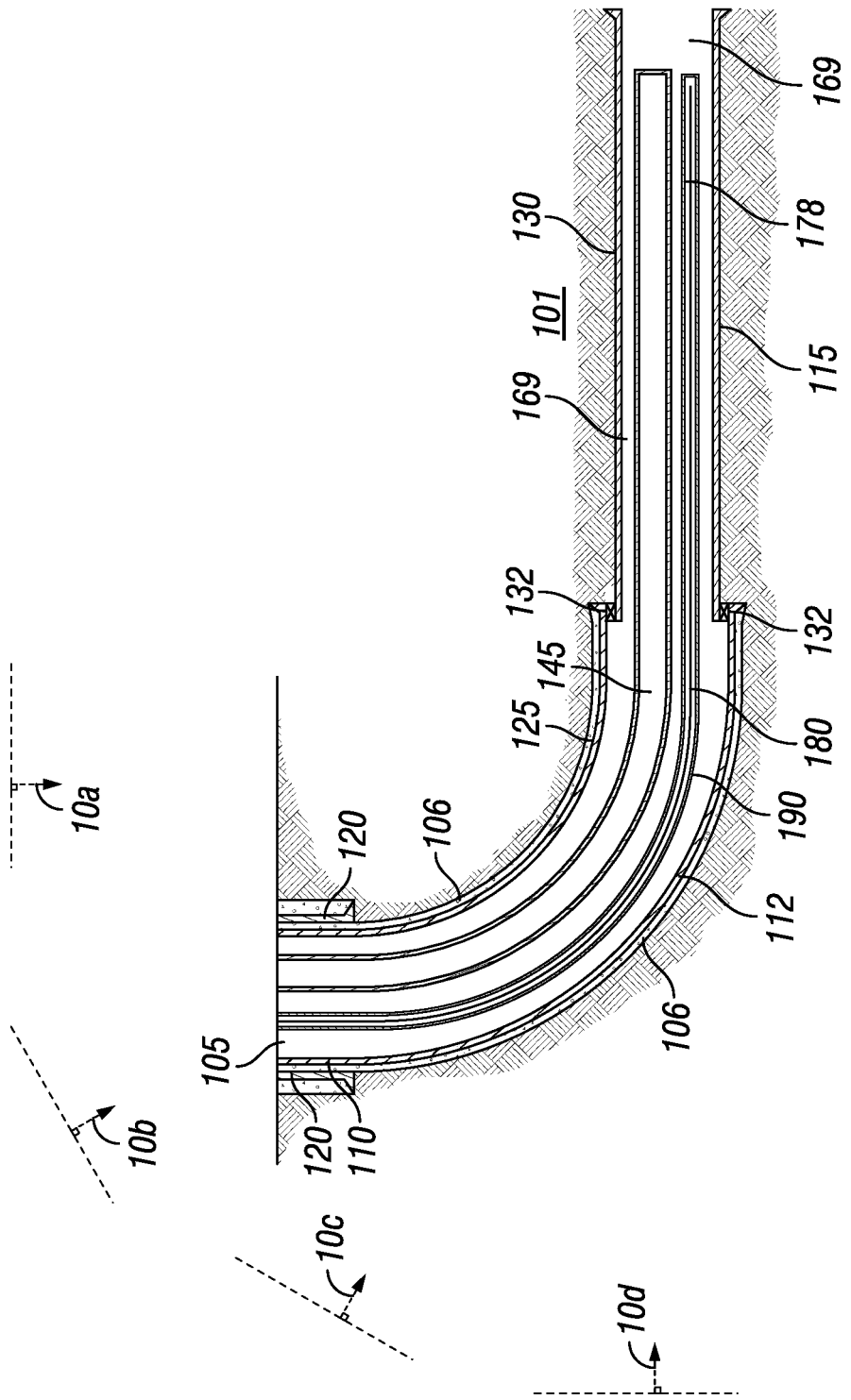
Figures 2, 2D:
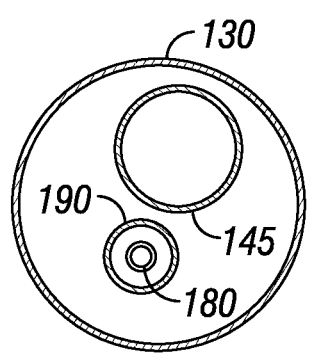
Figure 3:
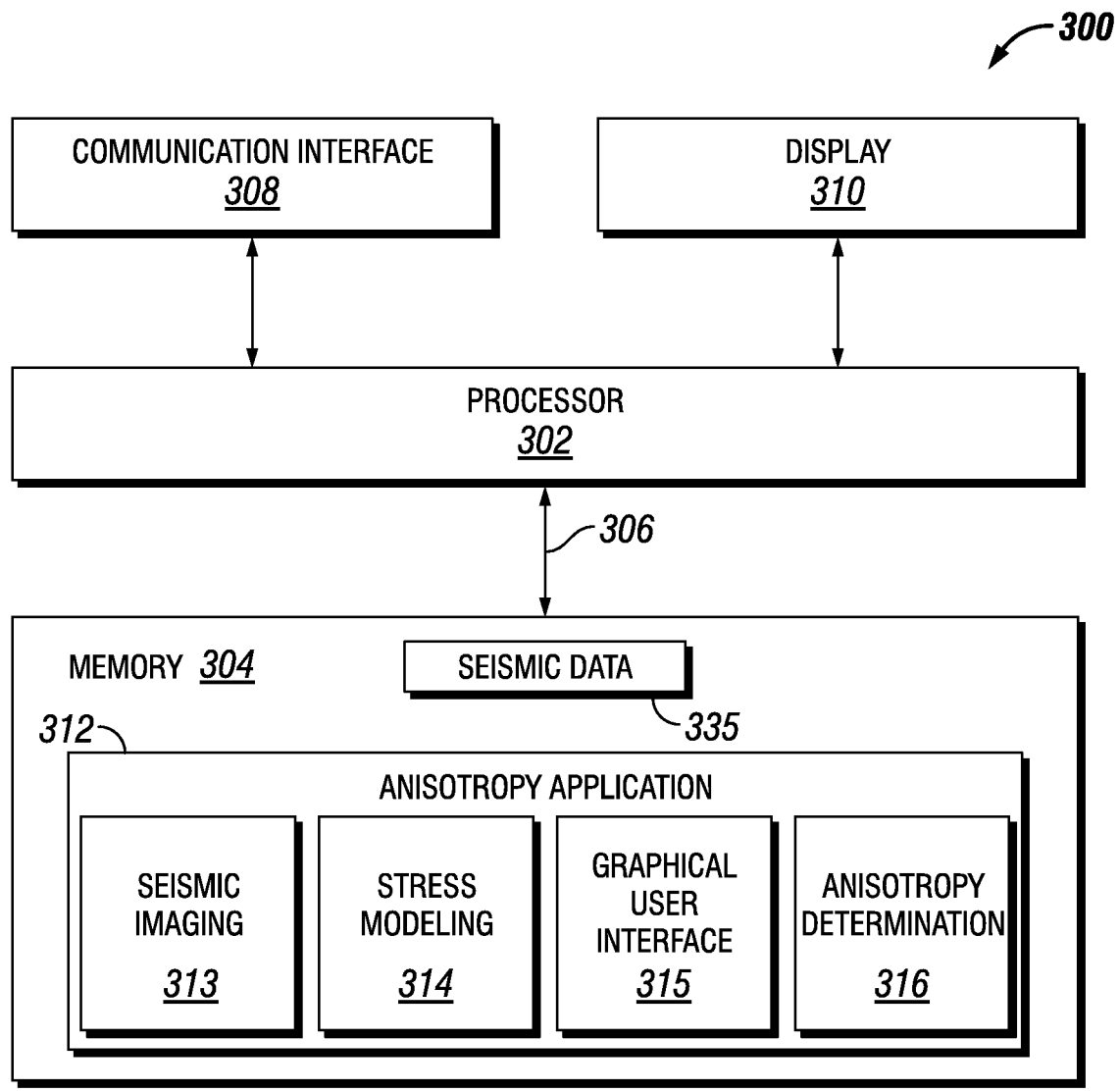
Figure 4:
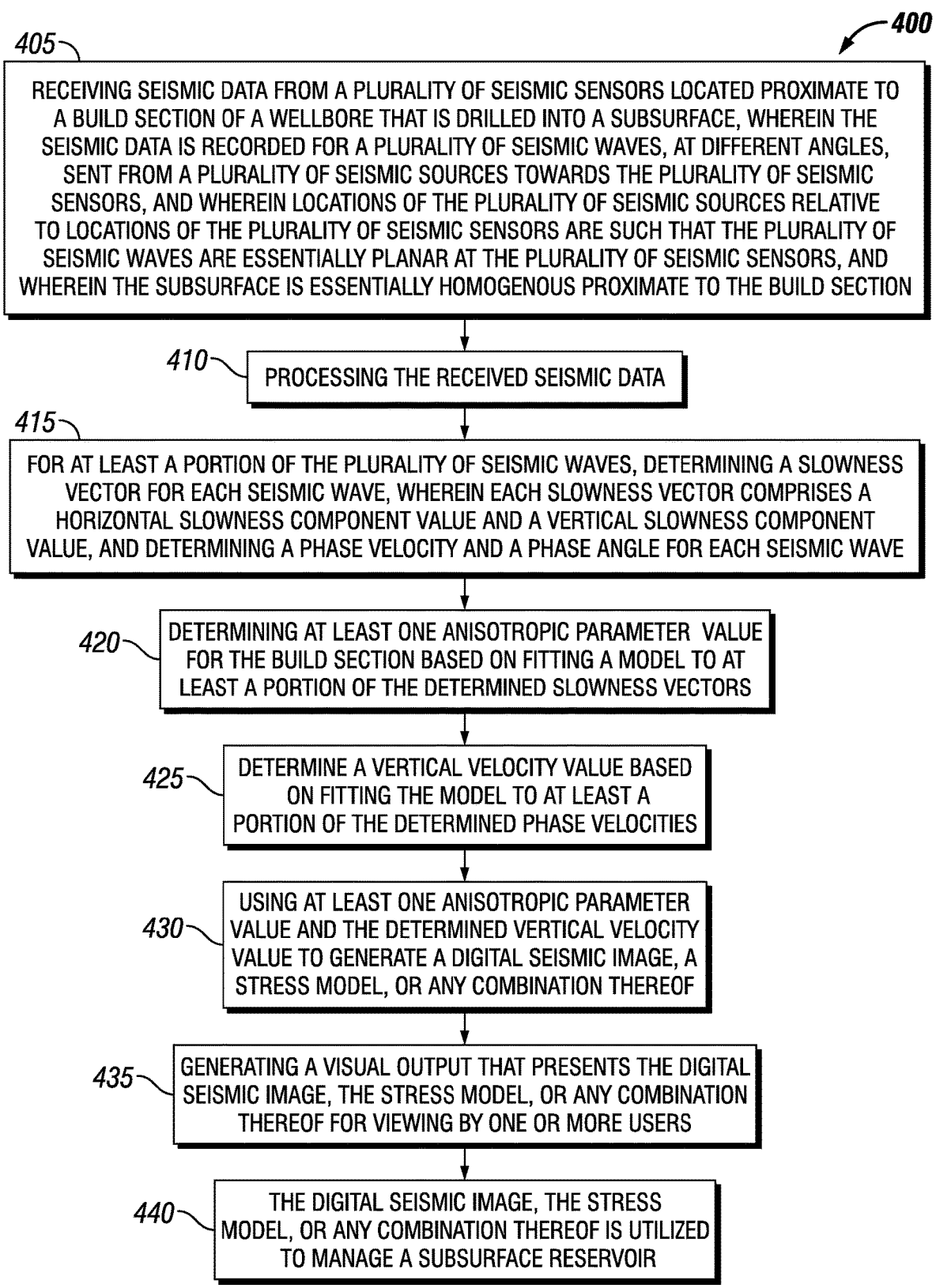

FO Cable—Capillary Tubing inside Instrument Coiled Tubing:

FIGS. 2D-1 and 2D-2 illustrate an embodiment in which the capillary tubing 180 may be positioned within an instrument coiled tubing 190. There may be one or more of the capillary tubing 180. In one embodiment, the scheme of FIGS. 2D-1 and 2D-2 is used as a temporary surveillance method (e.g., for a few days) so there is less chance of fiber degradation and capillary tubing corrosion. In another embodiment, the scheme works best with a larger size of liner 130 or casing 125 to avoid damage to the optical fiber 186 and sticking in the wellbore 105. The scheme of FIGS. 2D-1 and 2D-2 is flexible, allowing retrieval of optical fiber 186/capillary tubing 180. This setup may not include any packers 170.

Moreover, as illustrated in FIG. 2D-1, the capillary tubing 180 is proximate to the build section 112 of the wellbore 105 that is drilled into the subsurface 101. The subsurface 101 is essentially homogenous proximate to the build section 112. The locations of the plurality of seismic sources 5a-5d (FIG. 1A) relative to location of the capillary tubing 180 are such that the plurality of seismic waves 10a-10b are essentially planar at the capillary tubing 180.

FIGS. 1A, 1B-1, 1B-2, 1B-3, 1B-4, 1C, 1D, 1E, 2A-1, 2A-2, 2B-1, 2B-2, 2C-1, 2C-2, 2D-1, and 2D-2 are not necessarily drawn to scale and various modifications may be made. For example, some modifications may be found in U.S. Patent App. Pub. Nos. 2016/0281471, 2016/0281494, and 2016/0281456, each of which is incorporated by reference in its entirety.

Computing System:

FIG. 3 illustrates one embodiment of a computing system 300 for determining anisotropy for a build section of a wellbore in accordance with the disclosure. The computing system 300 includes a processor 302 communicatively connected to a memory 304 via a data bus 306. The processor 302 may be any of a variety of types of programmable circuits capable of executing computer-readable instructions to perform various tasks, such as mathematical and communication tasks. The computing system 300 may comprise a computer, a phone, a tablet, a laptop, a wireless device, a wired device, a plurality of networked devices, etc.

The memory 304 may include any of a variety of memory devices, such as using various types of computer readable or computer storage media. A computer storage medium or computer readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In example embodiments, the computer storage medium is embodied as a computer storage device, such as a memory or mass storage device. In particular embodiments, the computer-readable media and computer storage media of the present disclosure comprise at least some tangible devices, and in specific embodiments such computer-readable media and computer storage media include exclusively non-transitory media. In the embodiment shown, the memory 304 stores an anisotropy determination application 312.

The computing system 300 can also include a communication interface 308 configured to receive data, such as seismic data 335 from the plurality of seismic sensors (e.g., seismic data from the FO cable 178 illustrated as the capillary tubing 180). The seismic data from the FO cable is back scattered light, which is converted into a digital signal through a device known as an interrogator box that contains opto-electronic components. Other data may also be received via the communication interface 308. The communication interface 308 may also be configured to transmit data (e.g., transmit at least one anisotropic parameter value determined herein, at least one stress value determined herein, a digital seismic image generated herein, a stress model generated herein, etc.), or other functionality.

Additionally, a display 310 can be used for presenting a user interface associated with the anisotropy determination application 312, such as a graphical user interface 315. In various embodiments, the computing system 300 can include additional items, such as peripheral I/O devices, for example, to allow a user to interact with the user interface associated with the anisotropy determination 312. For example, the display 310 and the peripheral I/O devices may allow a user to provide user input, view and edit settings, manipulate digital images such as a digital seismic image generated herein, manipulate a stress model generated herein, manipulate the seismic data 335, or other functionality. In some embodiments, the user may even provide at least a portion of the seismic data 335 via the user interface. In various embodiments, the computing system 300 may allow for interaction with at least one other software item, at least one other hardware item, or both (e.g., software or hardware items from third parties) to carry out one or more claim elements or other functionality.

In some embodiments, the anisotropy determination application 312 may include a plurality of components to separate functionality. For example, the anisotropy determination application 312 may have separate components such as anisotropy determination 316 to determine at least one anisotropic parameter value using the seismic data 335, seismic imaging 313 to generate at least one digital seismic image using the at least one anisotropic parameter value that is determined, stress modeling 314 to generate at least one stress value and/or a stress model using the at least one anisotropic parameter value that is determined, and the graphical user interface 315 to provide a visual output that presents the digital seismic image, the stress model, the at least one anisotropic parameter value, the at least one stress value, etc. for viewing by one or more users (e.g., viewing view the display 310). The seismic imaging 313 may even be utilized to correct at least one digital seismic image using, for example, the at least one anisotropic parameter value that is determined. One or more components may allow the user to provide user input. In some embodiments, some components may be combined into a single component or fewer components. Alternatively, the anisotropy determination application 312 may not have any separate components. Furthermore, in some embodiments, the anisotropy determination application 312 may interact with software, hardware, or both from a third party.

In short, those of ordinary skill in the art will appreciate that various modifications may be made and the scope of the claims is not limited to the discussion herein. Indeed, embodiments of the present disclosure can be implemented as a system (e.g., a seismic surveillance system, a computing system, a combination of a seismic surveillance system and a computing system, etc.) a computer process (method), a process (method), a computing system, as an article of manufacture (e.g., computer readable medium or computer storage medium), etc.

Anisotropy Determination and Example-1

Turning to FIG. 4, this figure illustrates one embodiment of a method for determining anisotropy for a build section of a wellbore, referred to as a method 400, in accordance with the disclosure. The method 400 may be executed by the computing system 300 of FIG. 3. Those of ordinary skill in the art will appreciate that various modifications may be made to the method 400, and the scope of the claims is not limited to the discussion herein. For example, those of ordinary skill in the art will appreciate that the inventive principles may be implemented using automated steps only in some embodiments, or using a combination of automated and manual steps in other embodiments.

For ease of understanding, Example-1 will be used throughout and it relies on the seismic sources 5a-5d, the seismic waves 10a-10d, and the FO cable 178/the capillary tubing 180 of FIG. 1A. Of note, those of ordinary skill in the art will appreciate that quantities may remain the same or decrease throughout the method 400. For example, the same starting quantity of seismic waves at 405 may be used throughout out or the quantity may decrease at subsequent steps. Those of ordinary skill in the art will also appreciate that the starting quantity of seismic sources at 405 may be a subset of a larger quantity of seismic sources that are installed. Similarly, those of ordinary skill in the art will appreciate that the starting quantity seismic waves at 405 may be a subset of a larger quantity of seismic waves that are sent. Similarly, those of ordinary skill in the art will appreciate that the starting quantity of seismic sensors at 405 may be a subset of a larger quantity of seismic sensors that are installed.

At 405, the method 400 includes receiving seismic data from a plurality of seismic sensors located proximate to a build section of a wellbore that is drilled into a subsurface. The seismic data is recorded for a plurality of seismic waves, at different angles, sent from a plurality of seismic sources towards the plurality of seismic sensors. Locations of the plurality of seismic sources relative to locations of the plurality of seismic sensors are such that the plurality of seismic waves are essentially planar at the plurality of seismic sensors. As described above, this can be assessed from the "goodness of fit" arising from fitting the equation(s) to the picked travel times. Furthermore, the subsurface is essentially homogenous proximate to the build section. For example, whether or not the subsurface is essentially homogenous may be determined from one or more core samples, one or more logs, one or more previously generated seismic images, data corresponding to this wellbore, etc.

Turning to the Example-1, the seismic sources 5a-5d are triggered and the FO cable 178 illustrated as the capillary tubing 180 record the seismic data 335 for the seismic waves 10a-10d that travel into the subsurface 101. The seismic data 335 that is recorded may include a plurality of traces, etc. The seismic data 335 may be common shot gather data.

At 410, the method 400 includes processing the received seismic data. For example, the seismic data 335 may undergo a number of processing steps, such as deghosting, multiple removal, wavefield separation, receiver motion correction, spectral shaping, and the like. These examples are not meant to be limiting.

In addition, some seismic sensors, such as FO cables and/or FO sensors, may require/lend themselves to additional processing steps to obtain useful seismic information. Those of skill in the art will appreciate that there are a number of useful seismic processing steps that may be applied to seismic data before it is deemed ready for imaging. The seismic data may be used to derive a subsurface velocity model, for example, by semblance analysis, tomography, or full waveform inversion. The processed seismic data and subsurface velocity model are used to perform seismic imaging such as migration (e.g., wave-equation migration, Gaussian beam).

Additionally, if an active seismic survey is not run, the FO cables and/or the FO sensors may still record seismic signals that can be used for other purposes, including, but not limited to, induced seismicity monitoring, microseismic measurements, passive interferometry, and subsurface integrity monitoring. Any of these techniques will produce seismic output volumes that may include, by way of example but not limitation, seismic post-stack images, seismic pre-stack images, and seismic attributes such as subsurface velocity. In some embodiments, the processing includes stacking, time depth, merge geometry, denoising, etc.

Turning to the Example-1, any of these processing operations may be performed on the seismic data 335 at 410 and/or at a later step.

At 415, the method 400 includes, for at least a portion of the plurality of seismic waves, determining a slowness vector for each seismic wave. A particular slowness vector corresponding to a particular seismic wave includes a horizontal slowness component value and a vertical slowness component value for that particular seismic wave. For example, if there are ten seismic waves, then ten slowness vectors may be determined. However, fewer seismic waves may be selected in some embodiments and a slowness vector may be determined for each of the seismic waves that is selected. In some embodiments, it is desirable to determine at least one slowness vector for each seismic source, but that is not necessary in other embodiments.

Determining the slowness vector for each seismic wave includes using the seismic data to determine a travel time, such as using a consistent arrival, for each seismic wave. Consistent arrival refers to using the same type of arrival, such as using direct arrival. Determining the travel times may include selecting the maximum amplitude from the seismic data for each seismic wave. Determining the travel times may also include determining phase velocity from the seismic data for each seismic wave. For example, the approximate linearized phase velocity expression given by Thomsen as Equation 16a in Thomsen, L. 1986. Weak Elastic Anisotropy. Geophysics 51(10), 1954-1966. https://doi.org/10.1190/1.1442051, which is incorporated by reference in its entirety, may be used for determining phase velocity:

$$v_p(\theta) = \alpha_0(1 + \delta \sin^2 \theta \cos^2 \theta + \varepsilon \sin^4 \delta) \quad \text{Equation 1}$$

Next, the travel times may be determined using Equation 2 with the result from Equation 1:

$$\tilde{S} \cdot \tilde{X} = \frac{\hat{n} \cdot \tilde{X}}{V(\theta)} = \frac{\sin(\theta) \cdot x + \cos(\theta) \cdot z}{V(\theta)} \quad \text{Equation 2}$$

where $\tilde{S}$ is a slowness vector and $\tilde{X}$ is a position vector. A slowness vector can be defined in terms of a planar wave propagation unit vector n and a scalar planar wave phase velocity $V(\theta)$.

Determining the slowness vectors also includes using one or more of the equations 3-5 below with the determined travel times. Equation 3 is provided below. T is a vector of length n containing the observed travel times from the $n^{th}$ seismic sensor in the seismic sensor array, X is a n×2 matrix describing the seismic sensor positions and S is the slowness vector.

$$X \cdot S = T \quad \text{Equation 3}$$

Equation 4 is provided below. For the case where there are N seismic sensors located at $X=(x_i, z_i)$, for the $i^{th}$ seismic sensor then the corresponding travel time is ti, which in matrix form can be written as:

$$\begin{pmatrix} x_1 & z_1 \\ \cdot & \cdot \\ x_N & z_N \end{pmatrix} \begin{pmatrix} s_x \\ s_z \end{pmatrix} = \begin{pmatrix} t_1 \\ \cdot \\ t_N \end{pmatrix} \quad \text{Equation 4}$$

Equation 5 is provided below. Equation 4 can be readily inverted to Equation 5 to estimate values for the two slowness components. Equation 5 may be derived for the slowness components along the wellbore, which may be computed by taking the travel time derivative with respect to the length along the wellbore. This apparent array slowness is equal to the scalar product between the slowness vector and the unit vector defining the wellbore trajectory at the seismic sensor.

$$S = (X^T X)^{-1} T \quad \text{Equation 5}$$

For example, to determine the slowness vectors, Equation 2 may be utilized to determine the travel times, the result of Equation 2 may be used with Equation 4, the result of Equation 4 may be used with Equation 5, and the result of Equation 5 may provide the horizontal slowness component values (i.e., Sx values) and the vertical slowness component values (i.e., Sz values) of the slowness vectors. Thus, the determined travel time for each seismic wave is used to determine the horizontal slowness component value and the vertical slowness component value of that slowness vector.

Of note, a phase angle may be determined using arc tangent (atan) of the vertical slowness to the horizontal slowness. Arc tangent refers to inverse tangent. For instance, atan(1)=45 degrees.

Figure 5:
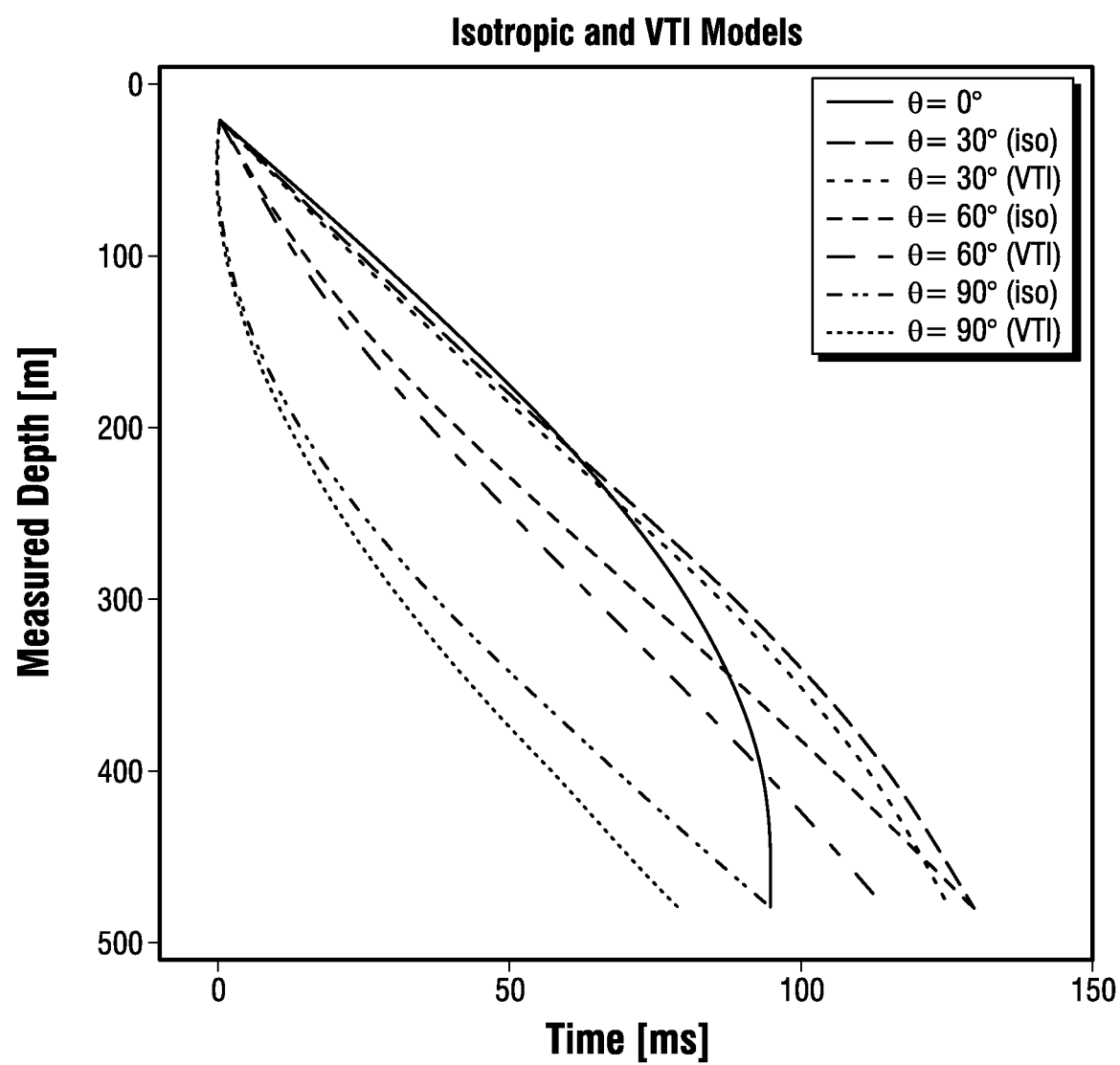
FIG. 5 illustrates an example of travel times that may be determined in accordance with FIG. 4.

Turning to the Example-1, the travel times were determined for the seismic waves 10a, 10b, 10c, 10d that are essentially planar at the FO cable 178 illustrated as the capillary tubing 180 with arrival angles of 0 degrees (vertically propagating), 30 degrees, 60 degrees, and 90 degrees (horizontally propagating), respectively. Using the Equation 2, travel times were determined for isotropic and anisotropic models as illustrated in FIG. 5. In this figure, the travel times for the isotropic model are illustrated as solid lines (i.e., labelled ISO for isotropy) and the travel times for the anisotropic model are illustrated as dotted lines (i.e., labelled VTI for vertical transverse isotropy). Table-1 below illustrates the horizontal and vertical slowness component values that were subsequently determined. Table-1 also illustrates the corresponding velocities calculated with Equation 1.

Turning to the vertical propagation seismic wave 10a with the angle of 0 degrees, the travel times are identical for isotropic and anisotropic models as the vertical velocities are identical for both models. In the vertical section 110 of the wellbore 105, it can be seen that the horizontal slowness component value measured along the capillary tubing 180 is equal to 0.33 s/km. Towards the heel of the wellbore 105, the wellbore 105 becomes horizontal and it can be seen that there is no moveout over the capillary tubing 180 because the arrival is perpendicular to the capillary tubing 180 at this point (i.e., the seismic wave 10a is vertical and the capillary tubing 180 is horizontal). The vertical slowness component value at this point is 0 s/km. Furthermore, combining these horizontal and vertical slowness component values yield a phase velocity of 3000 m/s for seismic wave 10a with the angle of 0 degrees.

Turning to the horizontally propagating seismic wave 10d with the angle of 90 degrees, in the vertical section 110 of the wellbore 105, it can be seen that there is no apparent moveout for both the isotropic and anisotropic models and hence the horizontal slowness component value is 0 s/km. In the horizontal section 115 of the wellbore 105, it can be seen that there is a difference of 16 ms in the travel times between the anisotropic and isotropic models. The vertical slowness component value at this point is 0.282 s/km. Furthermore, combining these horizontal and vertical slowness component values yield a phase velocity of 3550 m/s for seismic wave 10d with the angle of 90 degrees.

Similarly, the horizontal and vertical slowness component values may also be determined for the other obliquely incident seismic wave 10b with the angle of 30 degrees and seismic wave 10c with the angle of 60 degrees, as illustrated in Table-1. The intermediate seismic sensors of the capillary tubing 180 can also be used to estimate the slowness components by inverting the travel time expression in Equation 2.

Of note, determining the apparent slowness over the build section 112 yields 0.33 s/km from the seismic wave 10a with the 0 degrees and 0.282 s/km from the seismic wave 10d with the 90 degrees. This implies that the planar wave phase velocities for the anisotropic models are 3000 m/s and 3550 m/s, respectively, as illustrated in Table-1. The phase velocities were determined from the vertical section 110 and the horizontal section 115 of the wellbore 105 for the seismic waves 10a, 10d as discussed above. Those of ordinary skill in the art will appreciate that each phase velocity is also a derived quantity from that slowness vector.

TABLE 1

Estimated horizontal and vertical slowness component values (columns 1 & 2) for the anisotropic model, as well as corresponding phase angles and phase velocities (columns 3 & 4)

| Horizontal slowness component value Sx [s/km] | Vertical slowness component value Sz [s/km] | Seismic Wave Phase Angle [Deg] | Phase Velocity [km/s] |
|---|---|---|---|
| 0.33 | 0.00 | 0 | 3.000 |
| 0.28 | 0.16 | 30 | 3.094 |
| 0.15 | 0.26 | 60 | 3.394 |
| 0.00 | 0.28 | 90 | 3.550 |

At 420-425, the method 400 includes determining at least one anisotropic parameter value for the build section based on fitting a model to at least a portion of the determined slowness vectors. For example, all of the determined slowness vectors or fewer than all of them may be used for the curve fitting. The at least one anisotropic parameter comprises a Thomsen epsilon ($\varepsilon$) value, a Thomsen delta ($\delta$) value, or any combination thereof. In one embodiment, the model comprises a VTI anisotropy model. In one embodiment, the model comprises an isotropic model. In some embodiments, at least three determined slowness vectors are used for the curve fitting. Values for the anisotropy parameters Thomsen epsilon and Thomsen delta can be determined using the anisotropy estimation techniques described in: Miller, D., and C. Spencer. 1994. An exact inversion for anisotropic moduli from phase slowness data. JOURNAL OF GEOPHYSICAL RESEARCH 99(B11) 21651-21657, which is incorporated by reference in its entirety.

The method 400, at 420, may also include determining a vertical velocity value based on fitting the model to at least a portion of the determined phase velocities. For example, all of the determined phase velocities or fewer than all of them may be used for the curve fitting. For example, the vertical velocity may correspond to the velocity at 0 degrees on the fitted curve.

Figure 6:
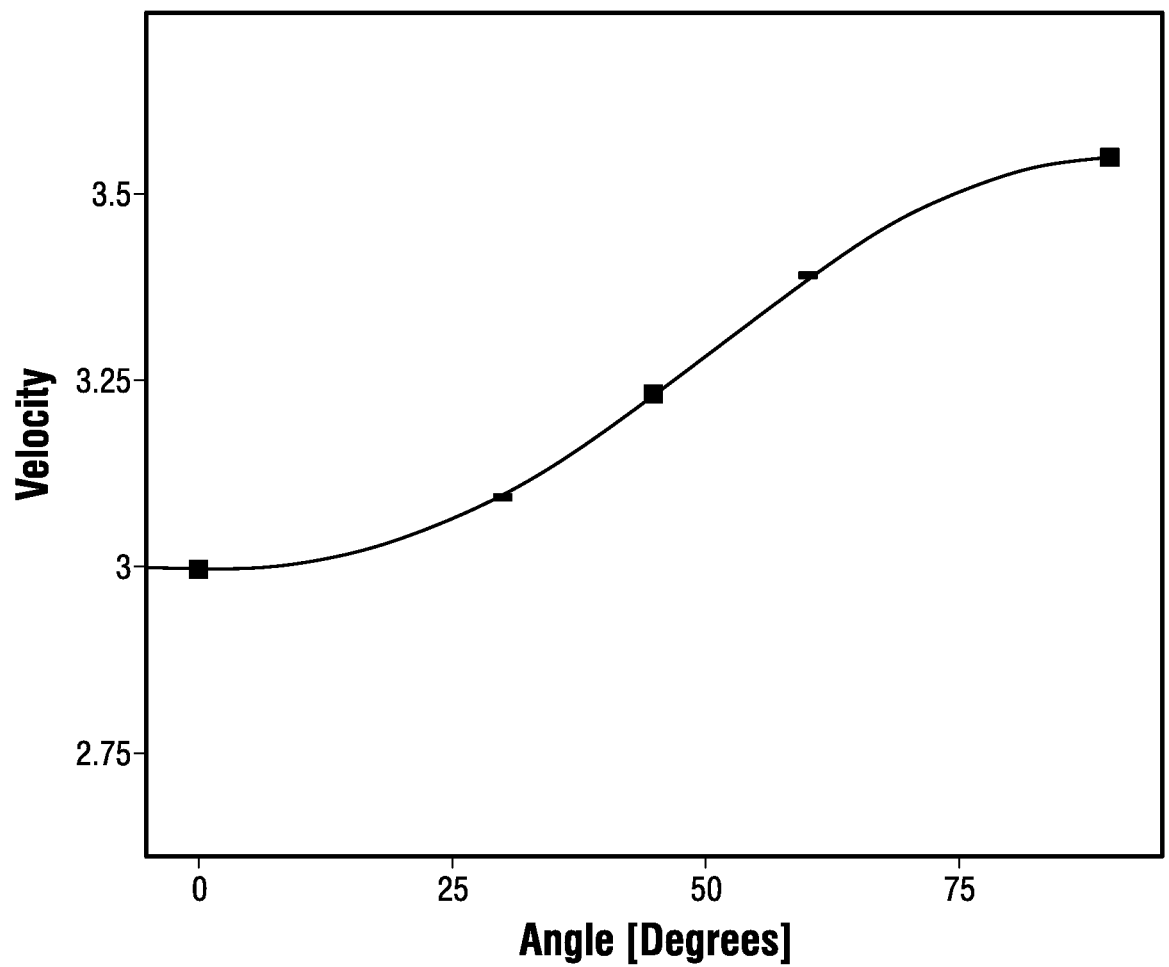
FIG. 6 illustrates an example of a best fitting modelled curve with anisotropic parameter values and a vertical velocity value in accordance with FIG. 4.

Turning to the Example-1, FIG. 6 illustrates the best fitting modelled curve with the anisotropic parameter values of: $\delta$=0.20 and $\delta$=0.10. The vertical velocity is: Vp=3000 m/s. The slowness data are indicated with velocity error bars. The squares at 0, 45, and 90 are control points used in interactive anisotropy fitting. The plot shows a misfit surface where $\varepsilon$ and $\delta$ are varied and the vertical velocities are held constant.

At 430, the method 400 includes using the at least one anisotropic parameter value that was determined to generate a digital seismic image, a stress model, or any combination thereof. The method 400, at 430, may also include using the determined vertical velocity value to generate the digital seismic image, the stress model, or any combination thereof. For example, generating the digital seismic image may include creating a velocity model using the determined anisotropic parameters values from 420 and the determined vertical velocity value from 420. Conventional techniques for digital seismic imaging and stress modeling may be used, except that $\varepsilon$=0.20, $\delta$=0.10, and Vp=3000 m/s from the Example-1, for instance, is utilized. By doing so, the digital seismic image that is generated may be more accurate, especially as the digital seismic image will account for the anisotropy.

The at least one anisotropic parameter value may be utilized to determine at least one stress value as described in Banik, N. C., & Egan, M. S. (2012, Jan. 1). Effects of VTI anisotropy on shale reservoir characterization. Society of Petroleum Engineers. https://doi:10.2118/150269-MS, which is incorporated herein by reference. The at least one stress value may then be utilized to generate the stress model. By doing so, the stress model may be more accurate, especially as the stress model will account for the anisotropy. The at least one anisotropic parameter value may be used in a similar way to generating the digital seismic image. The stress model is the end result and the anisotropy may be one of the inputs.

Digital seismic imaging is discussed, for example, in the following: U.S. patent application Ser. No. 15/725,391 and U.S. Patent App. Pub. No. 2017/0276813, each of which is incorporated by reference in its entirety. Stress modeling is discussed, for example, in the following: U.S. Patent App. Pub. No. 2016/0034612, which is incorporated by reference in its entirety. The following documents also discuss anisotropy, digital seismic imagining, and/or stress modeling: U.S. Patent App. Pub. No. 2010/0135115, U.S. Patent App. Pub. No. 20160291180, U.S. Pat. Nos. 8,332,156, and 7,480,206, each of which is incorporated by reference in its entirety.

At 435, the method 400 includes generating a visual output that presents the digital seismic image, the stress model, or any combination thereof for viewing by one or more users. For example, generating visual output that presents the digital seismic image and/or the stress model determined in a unique and specific manner by a computing system that includes non-transient, electronic storage, and one or more physical processors. The visual output generated provides the digital seismic image and/or stress model that previously was not accessible via existing systems and/or methods. Thus, the embodiments herein provide an improvement to existing systems and/or methods. Turning to the Example-1, a visual output of the seismic image, the stress model, or any combination thereof may be generated for viewing by one or more users via the graphical user interface 315 on the display 310.

At 440, the method 400 includes managing a subsurface reservoir using the digital seismic image, the stress model, or any combination thereof. For example, the seismic image and/or stress model may be interpreted to determine various geologic features of the subsurface volume of interest. Turning to the Example-1, the seismic image and/or stress model plus the interpretation may then be used to identify subsurface reservoirs bearing hydrocarbons in the subsurface 101 and to manage the reservoir, including calculating hydrocarbon volumes within the reservoir, identifying optimum wellbore placement, drilling wellbores, producing the hydrocarbons from the reservoir, and other reservoir management decisions such as enhanced production through injection wellbores, amongst other examples.

Those of ordinary skill in the art will appreciate that various modification may be made to the method 400 in FIG. 4. For example, while the Example-1 has been constrained to a vertical 2D plane, it is possible to extend the method to the case of out of plane arrivals by the use of a 3D wellbore trajectory where the wellbore is deviated azimuthally as well as vertically ("corkscrew") or inferring the azimuthal direction of propagation by, for example, using the polarization of the direction P arrival or assuming the arrival to be travelling the vertical plane between the seismic source and seismic sensor.

In short, as explained herein, some rocks are anisotropic, that is, their response to an applied force depends on the direction in which that force is applied. The most commonly observed anisotropic effect in sedimentary rocks is referred to as Transverse Isotropy due to a layering. Anisotropic effects are important as they influence subsurface interpretation, modelling, and production techniques. For example, in seismic imaging, anisotropy results in the directional dependence of velocity which needs to be taken into account if accurate subsurface seismic images are to be produced. One means of estimating anisotropy is to use a walkaway VSP, where a seismic array is deployed in a wellbore. In the case that the overlaying formation is horizontally layered, it is possible to reconstruct a slowness curve that can be inverted to estimate the elastic parameters over the array's location. Again, in the case that the overburden is near horizontal, it is possible to transform this geometry into an equivalent one where a single source is located on the surface and there is a grid of subsurface seismic sensors. With this geometry, the wavefront can be analyzed in terms of local properties around the seismic sensor array. This behavior can be characterized by constructing a slowness curve for the walkaway data (or a slowness surface in the case of a 3D VSP), which involves differentiating the travel times with respect to offset and depth to obtain horizontal and vertical slowness component values. This slowness data can then be inverted to estimate the elastic properties around the receiver array.

However, those of ordinary skill in the art will appreciate that the embodiments disclosed herein do not require a horizontally layered overburden as is required with the conventional slowness curve method. Furthermore, the embodiments disclosed herein recognize that a wellbore with a changing deviation can also be used to extract more than one component of the slowness vector, subject to the additional assumption that seismic waves are essentially planar over the seismic sensor array deployed over wellbore section where the deviation is changing. Another way to consider this is to consider the extreme situation where a deviated wellbore undergoes an instantaneous 90 degree change in direction from vertical to horizontal. In such a situation, the vertical and horizontal slowness component values of a planar wave arrival is computed from the vertical and horizontal sections of the wellbore. Moreover, seismic arrivals may be measured over the build section with very fine spatial sampling using a FO cable compared with conventional wireline deployed seismic arrays (e.g., 2 m compared with 15 m respectively). One or more optical fibers, for example, capable of distributed acoustic sensing, may be deployed along the entire length of the wellbore to measure the seismic arrivals.

Example-2

Figure 7:
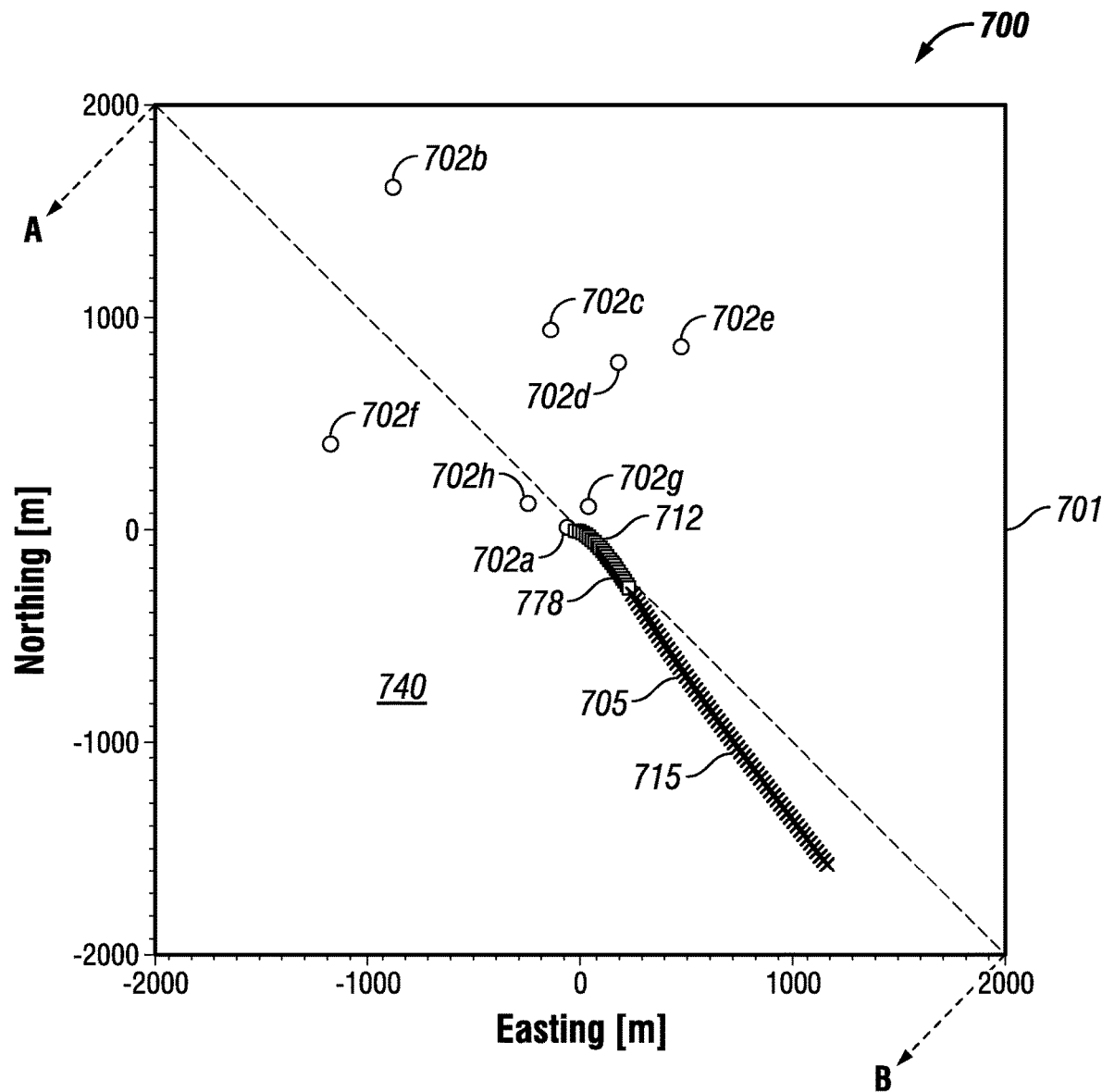
FIG. 7 illustrates another example, in aerial view, illustrating locations of seismic sources and a trajectory of a wellbore with a build section in accordance with the disclosure.
Figure 8:
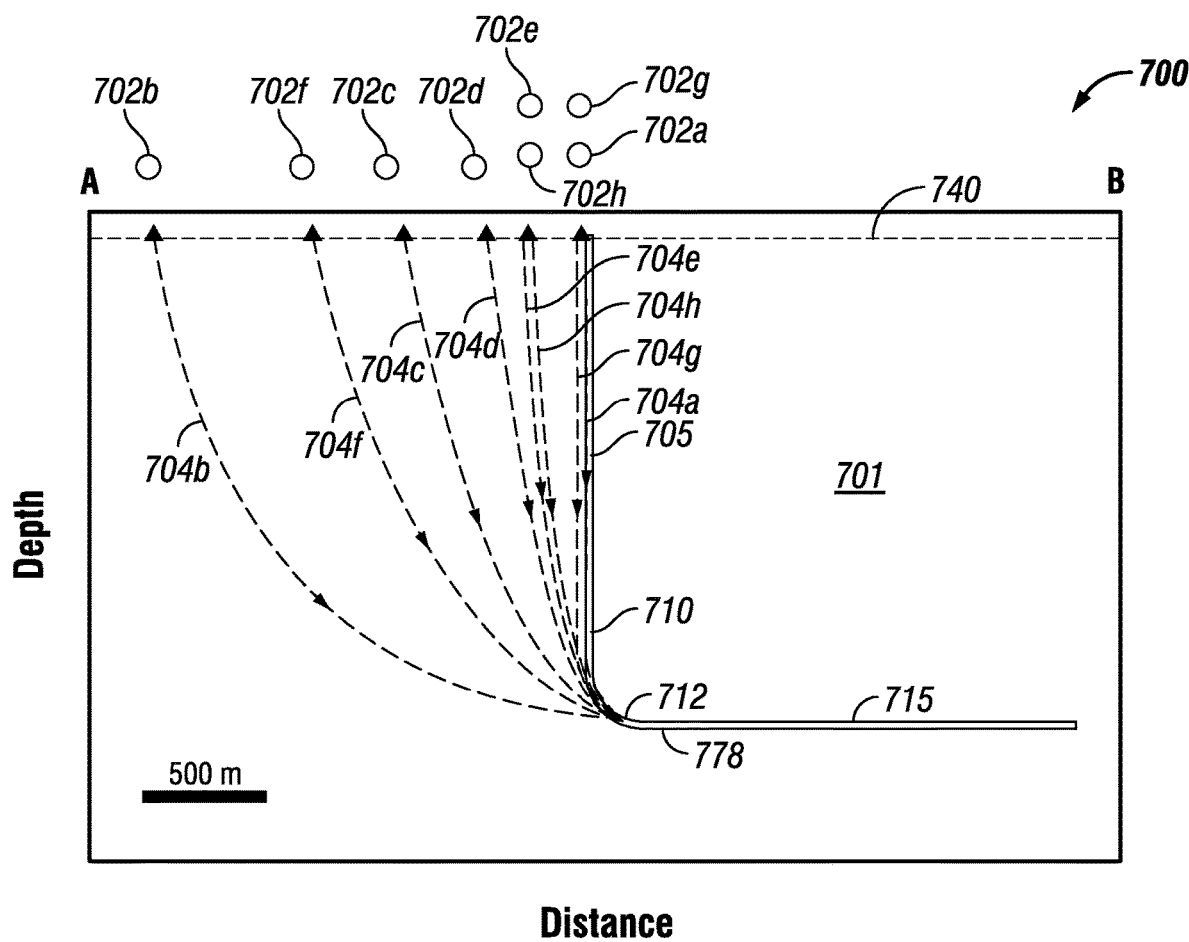
FIG. 8 illustrates a cross-sectional view of FIG. 7.

Turning to FIGS. 7-8, a VSP was acquired in a horizontal wellbore 705 using a FO cable 778 that performs distributed acoustic sensing. The FO cable 778 allowed seismic measurements to be measured along the entire length of the horizontal wellbore 705, including along a vertical section 710, a build section 712, and a horizontal section 715. In this example, the build section 712 was drilled with a build rate of approximately 8 degrees/30 m.

Seismic data was acquired using the FO cable 778, sampling from a surface 740 to the toe of the horizontal wellbore 705, with seismic sensors at a spacing of approximately 1 m within the FO cable 778. The seismic data was acquired from a total of 21 vibroseis vertical seismic sources distributed around the horizontal wellbore 705. A subset of 8 shot points, corresponding to seismic sources 702a-702h, was selected from the larger set based on the continuity and signal to noise ratio of the direct arrival over the build section 712. The locations of the seismic sources 702a-702h relative to the locations of the FO cable 778 are such that the plurality of seismic waves 704a-702h are essentially planar at the FO cable 778. Furthermore, the subsurface 701 is essentially homogenous proximate to the build section 712. FIG. 7 illustrates acquisition geometry for the VSP showing a plan view or aerial view with squares indicating the locations of the seismic sources 702a-702h and the solid black line indicating the trajectory of the horizontal wellbore 705. FIG. 8 illustrates a vertical projection in the NE direction along the line A-B as indicated on the plan view of FIG. 7.

Figure 9:
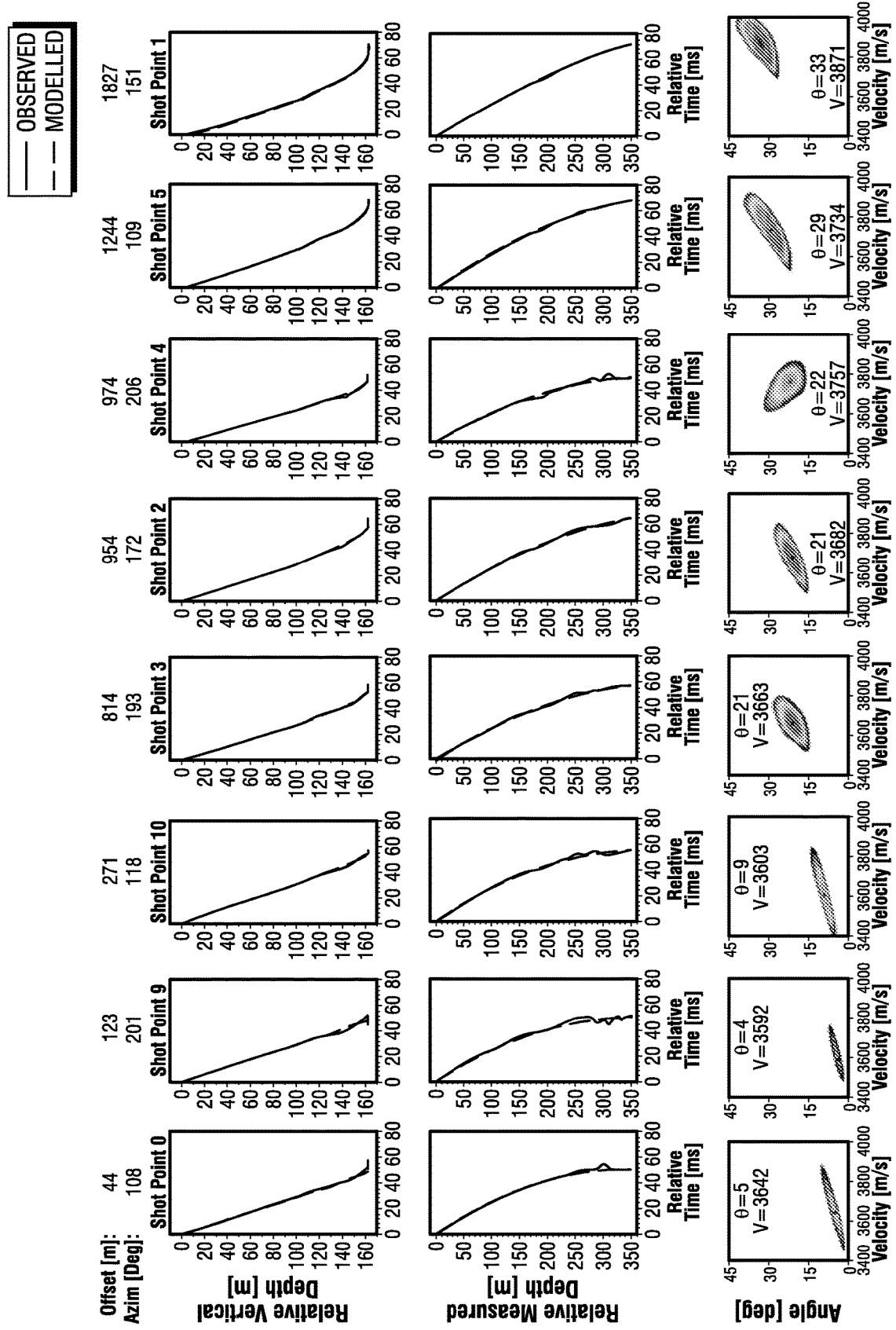
FIG. 9 illustrates an example of travel times that may be determined in accordance with FIG. 7.

Regarding determining a slowness vector for the seismic waves 704a-702h of the seismic sources 702a-702h, the slowness vectors in Table-2 below were generated for the seismic waves 704a-702h. The travel times to generate the slowness vectors were picked on the trough of the direct arrivals. The slowness data were generated for each shot gather using a method to find the velocity and angle of incidence that best match the measured direct arrival times. The estimated phase velocities and incidence angles range from 4 degrees to 33 degrees and 3600 m/s to 3900 m/s, as illustrated in Table-2 below. FIG. 9 illustrates results of slowness estimation for the VSP. The top row illustrates the travel time picks as a function of vertical depth relative to the seismic sensor at a particular depth for each of the shot points. The plots are ordered with increasing offset to the right. The middle row illustrates the travel times as a function of measured depth. The bottom row illustrates cross plots of velocity and planar wave incidence angle where the shading indicates the fit to the observed model times with the shading towards the center indicating the best fit and the shading away from the center indicating the worst fit.

TABLE 2

Estimated horizontal and vertical slowness component values (columns 1 & 2), as well as corresponding phase angles and phase velocities (columns 3 & 4)

| Horizontal slowness component value Sx [s/km] | Vertical slowness component value Sz [s/km] | Seismic Wave Phase Angle [Deg] | Phase Velocity [km/s] |
|---|---|---|---|
| 0.023931 | 0.27353 | 5 | 3.642 |
| 0.01942 | 0.277718 | 4 | 3.592 |
| 0.043418 | 0.274129 | 9 | 3.603 |
| 0.097834 | 0.254868 | 21 | 3.663 |
| 0.097329 | 0.253553 | 21 | 3.682 |
| 0.099709 | 0.246789 | 22 | 3.757 |
| 0.129836 | 0.234232 | 29 | 3.734 |
| 0.140697 | 0.216655 | 33 | 3.871 |

Figure 10:
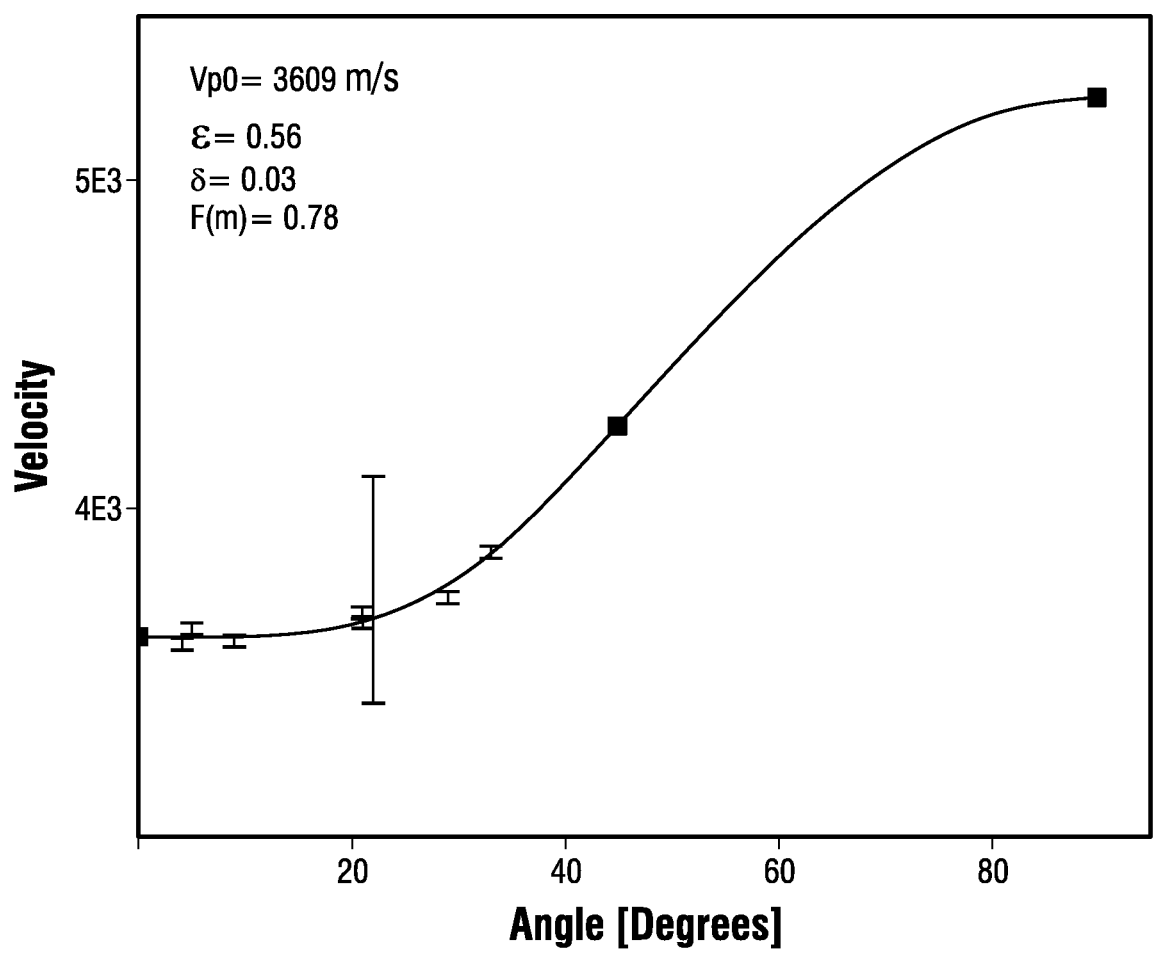
FIG. 10 illustrates an example of a best fitting modelled curve with anisotropic parameter values and a vertical velocity value in accordance with FIG. 7.

Regarding determining at least one anisotropic parameter value based on fitting a model to at least a portion of the determined slowness vectors, the slowness data from Table-2 was inverted for a VTI anisotropy model to obtain the Thomsen anisotropy parameter values of ε=0.56 and δ=0.03. The vertical velocity was also determined as Vp=3609 m/s. VTI anisotropy inversion for the slowness data from the VSP data illustrating the best fitting modelled curve with the parameters ε=0.56 and δ=0.03, as well as Vp0=3609 m/s, is illustrated as a solid curve in FIG. 10. The slowness data is indicated with velocity error bars. The squares at 0, 45, and 90 are control points used in interactive anisotropy fitting. The plots to the left show a misfit surface where ε and δ are varied, and the vertical velocities are held constant. The better fitting models have a lower misfit.

The Thomsen anisotropy parameter values of ε=0.56 and δ=0.03 are in good agreement with core measurements from a wellbore located 600 m away, where the mean value of Thomsen ε was 0.55±0.16 based on 8 core measurements. The Thomsen anisotropy parameter values of ε=0.56 and δ=0.03, as well as the vertical velocity value of Vp=3609 m/s, may be used to generate a digital seismic image, a stress model, or any combination thereof. A visual output that presents the digital seismic image, the stress model, or any combination thereof may be generated for viewing by one or more users and managing a subsurface reservoir.

Referring in particular to computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 400, above. Computer storage media does not include a carrier wave or other propagated or modulated data signal. In some embodiments, the computer storage media includes at least some tangible features; in many embodiments, the computer storage media includes entirely non-transitory components.

The description and illustration of embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

Moreover, while the invention has been described with reference to various embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It is to be expressly understood, however, that each of the figures is provided for the purpose of illustration and description only and is not intended to limit the present invention.

The invention claimed is:

1. A system for performing a seismic survey, the system comprising:
a plurality of seismic sources to send a plurality of seismic waves, at different angles, towards a plurality of seismic sensors proximate to a build section of a wellbore that is drilled into an anisotropic subsurface, wherein the subsurface is essentially homogenous proximate to the build section, wherein locations of the plurality of seismic sources relative to locations of the plurality of seismic sensors are such that the plurality of seismic waves are essentially planar at the plurality of seismic sensors for determining a phase velocity and a phase angle for each seismic wave; and
the plurality of seismic sensors to record seismic data for the plurality of seismic waves received at the plurality of seismic sensors from the plurality of seismic sources.

2. The system of claim 1, wherein the plurality of seismic sensors comprises a fiber optic cable configured for distributed acoustic sensing (DAS).

3. The system of claim 1, wherein the wellbore is a horizontal wellbore having a vertical section and a horizontal section with the build section located between the vertical section and the horizontal section.

4. The system of claim 1, further comprising a computing system that is configured to, for at least a portion of the plurality of seismic waves, determine a slowness vector for each seismic wave, wherein each slowness vector comprises a horizontal slowness component value and a vertical slowness component value, and wherein the computing system includes a processor and a memory operatively connected to the processor, the memory storing instructions executable by the processor.

5. The system of claim 4, wherein determining each slowness vector, the computing system is configured to:
use the seismic data to determine a travel time for each seismic wave, and
use the determined travel time for each seismic wave to determine the horizontal slowness component value and the vertical slowness component value of that slowness vector.

6. The system of claim 4, wherein the computing system is further configured to determine the phase velocity and the phase angle for each seismic wave.

7. The system of claim 6, wherein the computing system is further configured to determine at least one anisotropic parameter value for the build section based on fitting a model to at least a portion of the determined slowness vectors.

8. The system of claim 7, wherein the at least one anisotropic parameter value comprises a Thomsen epsilon (ε) value, a Thomsen delta (δ) value, or any combination thereof.

9. The system of claim 7, wherein the computing system is further configured to determine a vertical velocity value based on fitting the model to at least a portion of the determined phase velocities.

10. The system of claim 9, wherein the vertical velocity value is a velocity at 0 degrees in a fitted curve resulting from the fitting.

11. The system of claim 9, wherein the computing system is further configured to use the at least one anisotropic parameter value and the determined vertical velocity value to generate a digital seismic image, a stress model, or any combination thereof.

12. The system of claim 11, wherein the digital seismic image, the stress model, or any combination thereof is utilized to manage a subsurface reservoir.

13. A method of determining anisotropy for a build section of a wellbore, the method comprising:
receiving seismic data from a plurality of seismic sensors located proximate to a build section of a wellbore that is drilled into an anisotropic subsurface, wherein the seismic data is recorded for a plurality of seismic waves, at different angles, sent from a plurality of seismic sources towards the plurality of seismic sensors, and wherein locations of the plurality of seismic sources relative to locations of the plurality of seismic sensors are such that the plurality of seismic waves are essentially planar at the plurality of seismic sensors, and wherein the subsurface is essentially homogenous proximate to the build section;
for at least a portion of the plurality of seismic waves, determining a slowness vector for each seismic wave, wherein each slowness vector comprises a horizontal slowness component value and a vertical slowness component value, and determining a phase velocity and a phase angle for each seismic wave;
determining at least one anisotropic parameter value for the build section based on fitting a model to at least a portion of the determined slowness vectors;
determining a vertical velocity value based on fitting the model to at least a portion of the determined phase velocities; and
using the at least one anisotropic parameter value and the determined vertical velocity value to generate a digital seismic image, a stress model, or any combination thereof.

14. The method of claim 13, wherein the plurality of seismic sensors comprises a fiber optic cable configured for distributed acoustic sensing (DAS).

15. The method of claim 13, wherein the wellbore is a horizontal wellbore having a vertical section and a horizontal section with the build section located between the vertical section and the horizontal section.

16. The method of claim 13, wherein determining each slowness vector includes:
using the seismic data to determine a travel time for each seismic wave, and
using the determined travel time for each seismic wave to determine the horizontal slowness component value and the vertical slowness component value of that slowness vector.

17. The method of claim 13, wherein the at least one anisotropic parameter comprises a Thomsen epsilon (ε) value, a Thomsen delta (δ) value, or any combination thereof.

18. The method of claim 13, wherein the vertical velocity is a velocity at 0 degrees in a fitted curve resulting from the fitting.

19. The method of claim 13, wherein the digital seismic image, the stress model, or any combination thereof is utilized to manage a subsurface reservoir.

20. A system, comprising:
a processor; and
a memory operatively connected to the processor, the memory storing instructions that, when executed by the processor, cause the system to:
receive seismic data from a plurality of seismic sensors located proximate to a build section of a wellbore that is drilled into an anisotropic subsurface, wherein the seismic data is recorded for a plurality of seismic waves, at different angles, sent from a plurality of seismic sources towards the plurality of seismic sensors, and wherein locations of the plurality of seismic sources relative to locations of the plurality of seismic sensors are such that the plurality of seismic waves are essentially planar at the plurality of seismic sensors, and wherein the subsurface is essentially homogenous proximate to the build section;
for at least a portion of the plurality of seismic waves, determine a slowness vector for each seismic wave, wherein each slowness vector comprises a horizontal slowness component value and a vertical slowness component value, and determine a phase velocity and a phase angle for each seismic wave;
determine at least one anisotropic parameter value for the build section based on fitting a model to at least a portion of the determined slowness vectors;
determine a vertical velocity value based on fitting the model to at least a portion of the determined phase velocities; and
use the at least one anisotropic parameter value and the determined vertical velocity value to generate a digital seismic image, a stress model, or any combination thereof.

21. The system of claim 20, wherein the plurality of seismic sensors comprises a fiber optic cable configured for distributed acoustic sensing (DAS).

22. The system of claim 20, wherein determining each slowness vector includes:
using the seismic data to determine a travel time for each seismic wave, and
using the determined travel time for each seismic wave to determine the horizontal slowness component value and the vertical slowness component value of that slowness vector.

23. The system of claim 20, wherein the at least one anisotropic parameter comprises a Thomsen epsilon (ε) value, a Thomsen delta (δ) value, or any combination thereof.

24. The system of claim 20, wherein the vertical velocity is a velocity at 0 degrees in a fitted curve resulting from the fitting.

* * * * *